United States Patent
Vincze et al.

(10) Patent No.: US 10,334,585 B2
(45) Date of Patent: Jun. 25, 2019

(54) COORDINATED MULTIPOINT JOINT TRANSMISSION WITH RELAXED BACKHAUL REQUIREMENTS

(71) Applicant: Nokia Solutions and Networks Oy, Espoo (FI)

(72) Inventors: Zoltan Vincze, Kormend (HU); Csaba Vulkan, Budapest (HU); Arpad Drozdy, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 832 days.

(21) Appl. No.: 14/776,952

(22) PCT Filed: Mar. 15, 2013

(86) PCT No.: PCT/EP2013/055412
§ 371 (c)(1),
(2) Date: Sep. 15, 2015

(87) PCT Pub. No.: WO2014/139588
PCT Pub. Date: Sep. 18, 2014

(65) Prior Publication Data
US 2016/0037511 A1    Feb. 4, 2016

(51) Int. Cl.
*H04W 72/04* (2009.01)
*H04B 7/024* (2017.01)
(Continued)

(52) U.S. Cl.
CPC ........ *H04W 72/0426* (2013.01); *H04B 7/024* (2013.01); *H04B 7/0626* (2013.01); *H04W 92/20* (2013.01)

(58) Field of Classification Search
CPC . H04W 72/0426; H04W 92/20; H04W 36/02; H04W 72/1226; H04W 36/0088; H04B 7/024; H04B 7/0626
See application file for complete search history.

(56) References Cited

U.S. PATENT DOCUMENTS

2011/0268007 A1* 11/2011 Barany ................. H04B 7/024
370/312
2012/0329401 A1   12/2012 Wegmann et al.
(Continued)

FOREIGN PATENT DOCUMENTS

WO    WO 2012/084035 A1    6/2012

OTHER PUBLICATIONS

3GPP TR 36.819 V11.1.0 (Dec. 2011); 3rd Generation Partnership Project; Technical Specification Group Radio Access Network; Coordinated multi-point operation for LTE physical layer aspects (Release 11).
(Continued)

*Primary Examiner* — Kibrom T Hailu
(74) *Attorney, Agent, or Firm* — Harrinton & Smith

(57) ABSTRACT

A method for coordinated multipoint transmission includes collecting, in a serving CoMP-MA, channel state information, CSIs, reported by terminals served by eNBs within a cooperating set. The serving CoMP-MA selects dominant interferers as candidate transmitting eNBs for a terminal. CoMP joint transmission is initiated by forwarding, to the candidate transmitting eNBs, PDCP PDUs received from SGW and targeted to the selected terminal, and by setting the status of the terminal to joint transmission. High and low thresholds of PDCP buffers of the serving CoMP-MA are adjusted. As information required for air interface scheduling becomes available, the method includes extracting, in the serving CoMP-MA, radio resource allocations, RLC and MAC headers, references to user plane data, and precoding matrices from protocol entities, and forwarding them to the transmitting eNBs that have acknowledged PDCP PDUs, in order the transmitting CoMP-MA to prepare air interface for the terminal.

20 Claims, 14 Drawing Sheets

(51) Int. Cl.
H04B 7/06 (2006.01)
H04W 92/20 (2009.01)

(56) References Cited

U.S. PATENT DOCUMENTS

| | | | | |
|---|---|---|---|---|
| 2013/0165122 A1* | 6/2013 | Tanaka | ............. | H04B 7/024 455/436 |
| 2013/0176988 A1* | 7/2013 | Wang | ............. | H04W 28/08 370/331 |
| 2015/0009933 A1* | 1/2015 | Zirwas | ............. | H04B 7/024 370/329 |

OTHER PUBLICATIONS

Nokia Siemens Networks; LTE-Advanced; "The advances LTE toolbox for more efficient delivery of better use experience"; Technical White Paper; 2011.
R1-112392; Nokia Siemens Networks, et al.; "CoMP and the X2 interface"; 3GPP TSG-RAN WG1 Meeting #66; Athens, Greece, Aug. 22-26, 2011.
RFC 2474: K. Nichols, et al.; Definition of the Differentiated Services Field (DS Field) in the IPv4 and IPv6 Headers; Network Working Group; IETF, Dec. 1998.
RFC 2702: D. Awduche, et al.; Requirements for Traffic Engineering Over MPLS; Network Working Group; IETF, Sep. 1999.
F. Diehm, et al.; "The Futon Prototype: Proof of Concept for Coordinated Multi-Point in Conjunction with a Novel Integrated Wireless/Optical Architecture"; IEEE Wireless Communications and Networking Conference Workshops (WCNCW); IEEE Apr. 2010.
Daewon Lee, et al.; "Coordinated Multipoint Transmission and Reception in LTE-Advanced: Deployment Scenarios and Operational Challenges"; IEEE Communications Magazine, vol. 50, Issue 2, pp. 148-155; IEEE 2012.
J. Zhu, et al.; "A Practical Design of Downlink Coordinated Multi-Point Transmission for LTE-Advanced"; IEEE Vehicular Technology Conference (VTC Spring); May 2010.
T. Biermann, et al.; "Designing Optical Metro and Access Networks for Future Cooperative Cellular Systems"; ACM International Conference on Modeling, Analysis and Simulation of Wireless and Mobile Systems (MSWiM), Oct. 2011; pp. 265-273.
C. Choi, et al.; "Coordinated Multipoint Multiuser-MIMO Transmissions over Backhaul-Constrained Mobile Access Networks"; IEEE $2^{nd}$ International Symposium on Personal, Indoor and Mobile Radio Communications (PIMRC); Sep. 2011, pp. 1336-1340.
T. Okamawari, et al.; "Design of Control Architecture for Downlink CoMP Joint Transmission with Inter-eNB Coordination in Next Generation Cellular Systems"; Vehicular Technology Conference (VTC Fall); IEEE Sep. 2011.
V. Jungnickel, et al.; "Field Trials using Coordinated Multi-Point Transmission in the Downlink"; IEEE $21^{st}$ International Symposium on Personal, Indoor and Mobile Radio Communications Workshops (PIMRC Workshops); Sep. 2010; pp. 440-445.
R. Irmer, et al.; "Coordinated Multipoint: Concepts, Performance, and Field Trial Results"; IEEE Communications Magazine, vol. 49, Issue 2; pp. 102-111; Feb. 2011.
V. Jungnickel, et al.; "Coordinated Multipoint Trials in the Downlink"; GLOBECOM Workshops; IEEE 2009.
Choi, C., et al.; "Mobile WDM Backhaul Access Networks with Physical Inter-Base-Station Links for Coordinated Multipoint Transmission/Reception Systems"; IEEE Global Telecommunications Conference (CLOBECOM); Dec. 2011.
Shamai, S., et al.; "Joint Multi-Cell Processing for Downlink Channels with Limited-Capacity Backhaul"; Information Theory and Applications Workshop; IEEE 2008, pp. 345-349.
P. Marsch, et al.; "On Multi-Cell Cooperative Transmission in Backhaul-Constrained Cellular Systems"; May 2008; 28 pages.
P. Marsch, et al.; "On Downlink Network MIMO under a Constrained Backhaul and Imperfect Channel Knowledge"; IEEE Global Telecommunications Conference, GLOBECOM Nov.-Dec. 2009, IEEE.
A. Barbieri, et al.; "Coordinated Downlink Multi-Point Communications in Heterogeneous Cellular Networks"; Information Theory and Applications Workshop (ITA); IEEE, Feb. 2012.
Radisys White Paper; "Coordinated Multipoint Tx and Rx"; Nagi Mahalingam; Sep. 2011, 7 pages.
S. Brueck, et al.; "Centralized Scheduling for Joint Transmission Coordinated Multi-Point in LTE-Advanced"; International ITG Workshop on Smart Antennas (WSA); IEEE, Feb. 2010; pp. 177-184.
S. Brueck, et al.; "On MAC Layer Throughput Enhancements in LTE-A by Downlink Macro Diversity"; IEEE International Conference on Communications Workshops; Jun. 2009.
A. Papadogiannis, et al.; "DecentralisingMulticell Cooperative Processing: A Novel Robust Framework"; EURASIP Journal on Wireless Communications and Networking—Special issue on bradband wireless; Jun. 2009.
3GPP TS 36.323 V11.0.0 (Sep. 2012); 3rd Generation Partnership Project; Technical Specification Group Radio Access Network; Evolved Universal Terrestrial Radio Access (E-UTRA); Packet Data Convergence Protocol (PDCP) specification (Release 11).
3GPP TS 36.322 V11.0.0 (Sep. 2012); 3rd Generation Partnership Project; Technical Specification Group Radio Access Network; Evolved Universal Terrestrial Radio Access (E-UTRA); Radio Link Control (RLC) protocol specification (Release 11).
3GPP TS 36.321 V11.0.0 (Sep. 2012); 3rd Generation Partnership Project; Technical Specification Group Radio Access Network; Evolved Universal Terrestrial Radio Access (E-UTRA); Medium Access Control (MAC) protocol specification (Release 11).
3GPP TR 36.814 V9.0.0 (Mar. 2010); 3rd Generation Partnership Project; Technical Specification Group Radio Access Network; Evolved Universal Terrestrial Radio Access (E-UTRA); Further advancements for E-UTRA physical layer aspects (Release 9).
3GPP TSG RAN WG1 Meeting #66bis, Zhuhai, China, Oct. 10-14, 2011, R1-113063, "Considerations on Downlink CoMP Schemes in Release 11", Hitachi, 3 pgs.
3GPP TSG-RAN WG1 #68bis, Jeju, Korea, Mar. 26-30, 2012, R1-121516, "Discussion on X2 interface support for CoMP schemes", Intel Corp., 4 pgs.

* cited by examiner

COORDINATED MULTIPOINT JOINT TRANSMISSION WITH RELAXED BACKHAUL REQUIREMENTS

FIELD OF THE INVENTION

The exemplary and non-limiting embodiments of this invention relate generally to wireless communications networks, and more particularly to coordinated multipoint transmission.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

In legacy cellular telecommunication networks, inter-cell interference has a negative impact on the system performance, especially at cell boundaries. LTE (long term evolution) has no mechanism to eliminate interference as in LTE radio resources are defined and managed independently in every cell. In order to handle this deficiency, long term evolution-advanced (LTE-A) systems introduce a coordinated multipoint (CoMP) operation which coordinates transmission from neighbouring cells in order to decrease or even harness the inter-cell interference.

SUMMARY

The following presents a simplified summary of the invention in order to pro-vide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, computer program product, and a computer-readable storage medium as defined in the independent claims. Further embodiments of the invention are disclosed in the dependent claims.

An aspect of the invention relates to a method for coordinated multipoint transmission in a communications system comprising collecting, in a serving CoMP-MA, channel state information, CSIs, periodically reported by user terminals served by a base station within a cooperating set, and forwarding the CSIs periodically reported by the user terminals served by said base station to other base stations within the cooperating set; based on the collected CSIs, identifying and selecting, in the serving CoMP-MA, one or more dominant interferers as potential candidates for transmitting network nodes for a selected user terminal; initiating CoMP joint transmission by forwarding, to the candidates for the transmitting network node for the selected user terminal, PDCP PDUs received from a serving gateway and targeted to the selected user terminal and setting the status of the selected user terminal to joint transmission; receiving an acknowledgement on PDCP PDUs received in a candidate for the transmitting network node, in case the candidate transmitting network node is capable of handling the joint transmission to the user terminal; measuring, in the serving CoMP-MA, time spent between forwarding PDCP PDU and receiving a corresponding acknowledgement; adjusting, based on the measurement, a high threshold and a low threshold of predefined PDCP buffers of the serving CoMP-MA; in response radio information required for air interface scheduling becoming available, extracting, in the serving CoMP-MA, radio resource allocations, RLC and MAC headers, references to user plane data included, and precoding matrices from corresponding protocol entities, forwarding the extracted radio resource allocations, RLC and MAC headers, references to the user plane data included, and precoding matrices to the transmitting network nodes that have acknowledged PDCP PDUs, in order the transmitting CoMP-MA to be able to prepare for air interface scheduling for the user terminal.

A further aspect of the invention relates to a first apparatus comprising at least one processor; and at least one memory including a computer program code, wherein the at least one memory and the computer program code are configured to, with the at least one processor, cause the first apparatus to collect channel state information, CSIs, periodically reported by user terminals served by a base station within a cooperating set and forward the CSIs periodically reported by the user terminals served by said base station to other base stations within the cooperating set; collect channel state information, CSIs, for user terminals served by said other base stations within the cooperating set; based on the collected CSIs, identify and select one or more dominant interferers as potential candidates for transmitting network nodes for a selected user terminal; initiate CoMP joint transmission by forwarding, to the candidates for the transmitting network node for the selected user terminal, PDCP PDUs received from a serving gateway and targeted to the selected user terminal and set the status of the selected user terminal to joint transmission; receive an acknowledgement on PDCP PDUs received in a candidate for the transmitting network node, in case the candidate transmitting net-work node is capable of handling the joint transmission to the user terminal; measure time spent between forwarding PDCP PDU and receiving a corresponding acknowledgement; adjust, based on the measurement, a high threshold and a low threshold of predefined PDCP buffers of a serving CoMP-MA; in response radio information required for air interface scheduling becoming available, extract radio resource allocations, RLC and MAC headers, references to user plane data included, and precoding matrices from corresponding protocol entities, forward the extracted radio resource allocations, RLC and MAC headers, references to the user plane data included, and precoding matrices to the transmitting network nodes that have acknowledged PDCP PDUs, in order the transmitting CoMP-MA to be able to prepare for air interface scheduling for the user terminal.

A still further aspect of the invention relates to a second apparatus comprising at least one processor; and at least one memory including a computer program code, wherein the at least one memory and the computer program code are configured to, with the at least one processor, cause the second apparatus to forward, to other base stations within a cooperating set, channel state information, CSIs, periodically reported by user terminals served by the second apparatus; receive, from a serving CoMP-MA, channel state information, CSIs, collected from user terminals within a cooperating set, wherein one or more dominant interferers are selected in the serving CoMP-MA as potential candidates for transmitting network nodes for a selected user terminal; receive, from the serving CoMP-MA, PDCP PDUs received from a serving gateway and targeted to the selected user terminal, wherein CoMP joint transmission is initiated and the status of the selected user terminal is set to joint transmission; transmit, to the serving CoMP-MA, an acknowledgement on the received PDCP PDUs, in case a candidate transmitting network node is capable of handling the joint transmission to the user terminal; receive, from the serving CoMP-MA, extracted radio resource allocations, RLC and MAC headers, references to the user plane data included, and precoding matrices, in order the transmitting CoMP-MA to be able to prepare for air interface scheduling for the user terminal.

A still further aspect of the invention relates to a computer program product comprising program code means configured to perform any of the method steps when the program is run on a computer.

A still further aspect of the invention relates to a computer-readable storage medium comprising program code means configured to perform any of the method steps when executed on a computer.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

In the coordinated multipoint (CoMP) operation, neighbouring—thus potentially interfering—cells are grouped into so called (static and possibly overlapping) CoMP cooperating sets during network planning and configuration. Cells only cooperate with other cells of the same cooperating set. Downlink (DL) CoMP is referred to as CoMP transmission, uplink (UL) CoMP is referred to as CoMP reception. An exemplary embodiment relates to DL CoMP transmission, while UL CoMP reception may require dedicated solutions.

3GPP (3rd generation partnership project) defines several alternatives for CoMP transmission that require different levels of cooperation within the cooperating, namely coordinated scheduling/beamforming, dynamic cell selection, and joint transmission.

Figure 1:
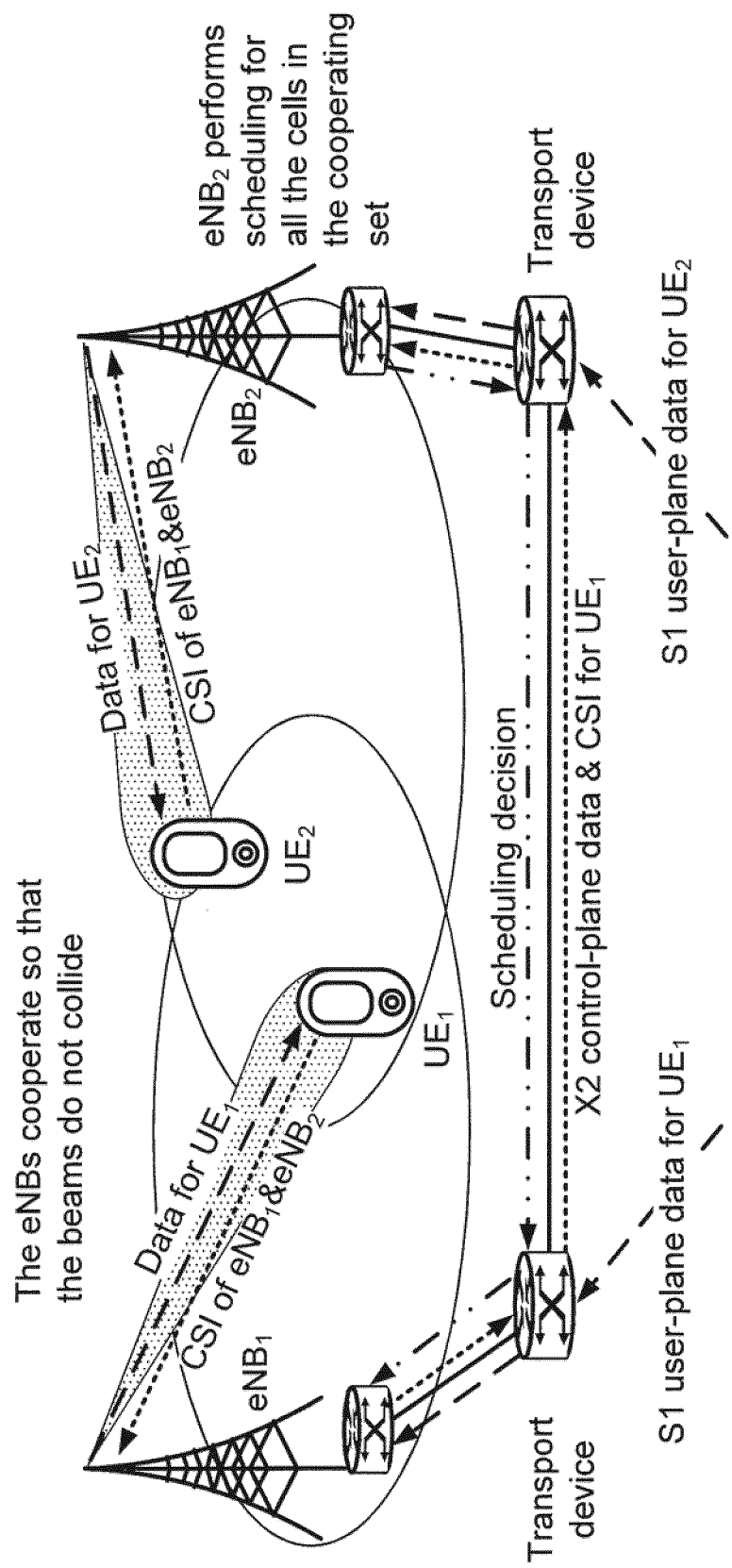
FIG. 1 illustrates coordinated beamforming.

Coordinated scheduling/beamforming (CS/CB) is an alternative where scheduling decisions are made with coordination among multiple transmission points, that is, the cells included in the cooperating set cooperate with each other to make cross-cell optimized scheduling decisions based on the channel state information (CSI) collected from user equipments (UE). CSI includes path loss and phase information calculated by UEs based on measurements of the radio channels from surrounding eNB (eNode-B) antennas. CSI is reported only to the serving eNB, which is the eNB that receives UL data transmission of UE. In order to reduce the amount of CSI data to be transferred over the air interface, UEs' reports are limited only to the neighbouring cells, i.e., CSI for cells with very large path loss to UE are the excluded from the reports. This subset of the cooperating set is referred to as a measurement set. While the cooperating sets are static and predetermined, the measurement set is dynamically assigned to each UE according to its location. CSI is collected from every eNB within the measurement set at a selected eNB which performs the cross-cell scheduling. The cross-cell scheduling is a form of scheduling where scheduling decisions for multiple cells are coordinated by taking into account the received CSI of every UE in any cell within the cooperating set. The selection of eNBs for the cross-cell scheduling role is implementation specific, that is, eNBs are either allocated to this role permanently (this statically selected cell is referred to as an anchor eNB), or each eNB schedules a fraction of the resources or eNBs take turns in scheduling. Alternatively, every eNB makes scheduling decisions cooperatively with other eNBs. Since each UE reports CSI only to the serving node, CSI has to be delivered from the serving nodes to the scheduling node(s). In coordinated scheduling, a cross-cell scheduler allocates the radio resources of each cells within the cooperating set, the term is used for the cells that have a single antenna. In coordinated beamforming coordinated cross-cell scheduling is performed for multi-antenna cells. In addition to radio resource allocation for UEs, the cross-cell scheduler determines beamforming weights for every antenna element, that is, there are as many beamforming weights as there are antenna elements, and together they form a beamforming vector. The transmission signal of UE is multiplied by the beamforming weights, which modifies the amplitude and phase of the signal before it is transmitted at the antenna element. Coordinated beamforming is illustrated in FIG. 1.

In case the cross-cell scheduler has specific knowledge of the state of the channels, coordinated beamforming may use a more advanced technique than simple beamforming called precoding, where CSI of UEs is exploited to provide additional transmit diversity and equalization at the transmitter. Since beamforming is a special version of precoding, throughout this document both of them may be referred to as precoding. In the case more than one UE is scheduled on a same physical resource block (PRB) of one cooperating set, or UE has more than one antenna element, the precoding vector expands to a precoding matrix. The proper selection of the precoding matrix decreases the interference between UEs' streams due to transmit diversity. The goal of coordinated scheduling/beamforming is to find ideal cross-cell optimized resource allocation and precoding matrices based on CSI for optimum performance. From the reported CSI, an estimated channel matrix may be assembled; a matrix that describes the connection between the transmitted and received signals at the antenna elements. The precoding matrix may generally be calculated by inverting the estimated channel matrix. The result of the cross-cell optimized scheduling decision is an optimized resource allocation that takes into account the reported air interface conditions of multiple cells and determines resource blocks allocated to UEs, and the related modulation and coding combination. Serving cell selection and user plane data transfer remains as in legacy systems, transmission data for UE is available at and transmitted from one serving eNB only; serving cells are changed only during legacy handovers.

Figure 2:
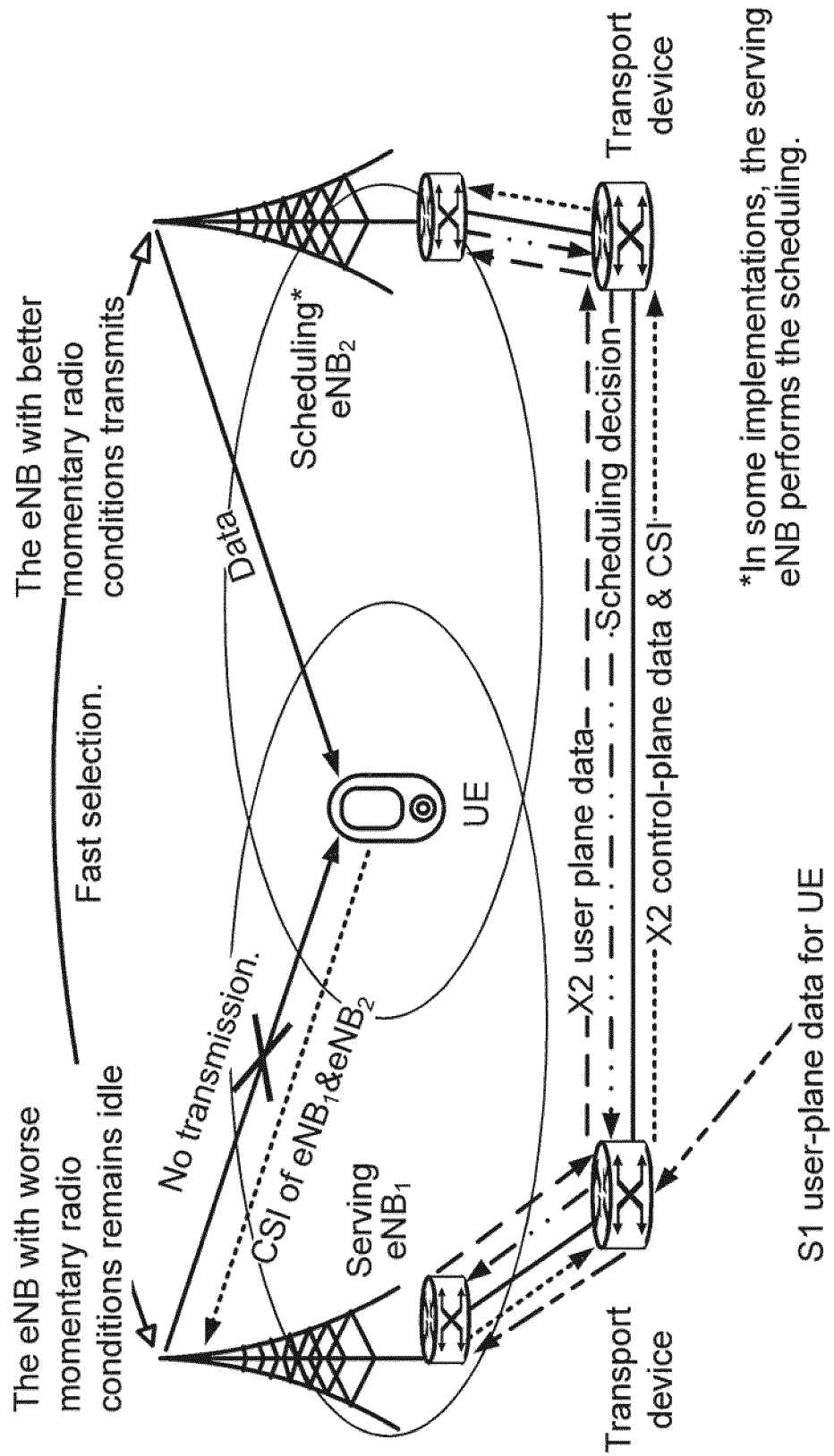
FIG. 2 illustrates dynamic cell selection.

Joint processing (JP) is an alternative technique which takes this approach further, that is, DL user plane data of UE is made simultaneously available at more than one cell within the CoMP cooperating set. This is achieved either by keeping an S1 interface (between a gateway and eNB) unmodified, and the DL data sent to the serving cell is forwarded over an X2 interface, or the S1 interface is modified so that the DL data may be multicast. In case of JP dynamic cell selection (DCS) the cells from which data is forwarded to UE are selected dynamically (see FIG. 2 illustrating dynamic cell selection). UE continuously reports channel quality measurements from multiple cells to the serving eNB, and the cell with the best DL channel quality and therefore best data rates per resource block is selected by the scheduling eNB. As the conditions change over time, the selected cell may change from one subframe to another. The fast selection and switching of the transmitting cell ensures that UE is served every time by the cell with the best radio conditions at the time but requires the DL user plane data to be available simultaneously at multiple cells. In addition to transmitting through the best possible eNB, the inter-cell interference is decreased by muting the same radio resources at the neighbouring cell(s) which generate the most interference during the time the data is transferred to UE. Accordingly, these cells suspend transmission on these resources, thus inter-cell interference is avoided.

Figure 3:
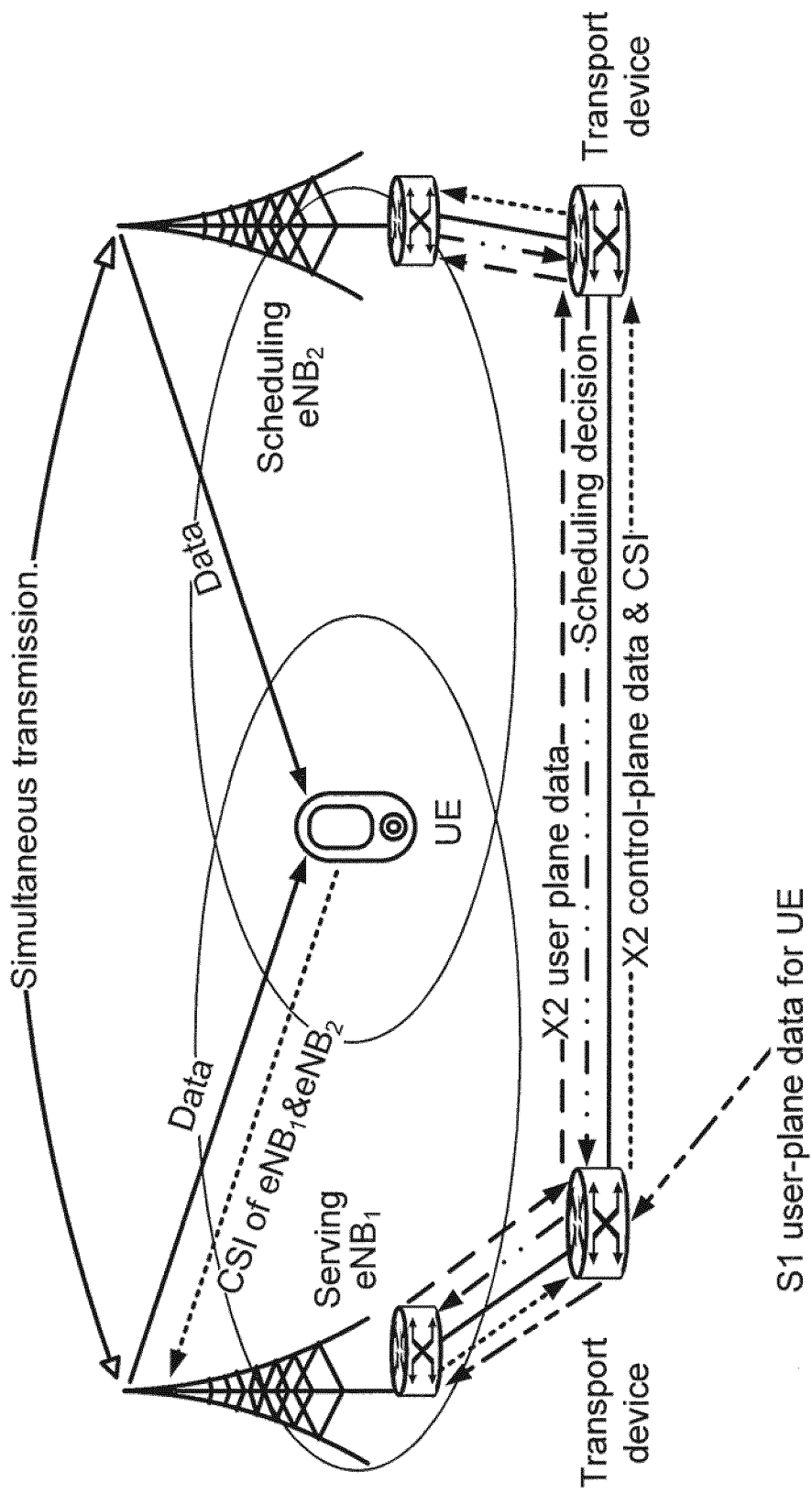
FIG. 3 illustrates CoMP JP joint transmission.

Contrary to DCS, CoMP JP joint transmission (JT) (see FIG. 3 illustrating joint transmission) improves the received signal strength and data throughput by simultaneously transmitting the data to a single or multiple UEs from multiple cells over the same time-frequency resources. Simultaneous transmission from multiple cells to the single UE is referred to as single-user (SU) CoMP JT, whereas simultaneous transmission from multiple cells to the multiple UEs is referred to as multi-user (MU) CoMP JT. This mechanism provides the opportunity to harness what in legacy systems is harmful inter-cell interference and turn it into useful signals, enabling an increase in spectral efficiency and cell edge performance.

The joint transmission requires accurate CSI reporting and its timely distribution between transmitting nodes so that efficient scheduling and precoding is possible. Whether the precoding is done at one eNB or multiple eNBs is implementation specific. Due to the fast fluctuation of channel states, CSI has to be up to date or otherwise efficiency degrades. In case of SU CoMP JT, DL CSI of the cells in the measurement set is measured and reported by UE to its serving node and forwarded to the scheduling node. Based on the reported CSI, it is decided which cells (usually the serving cell and other cells with good radio channels to UE) are to transmit to UE (in some implementations, each node in the cooperating set participates in the transmission). This subset of the measurement set, the set of transmitting cells is referred to as the transmission set. If UE is served with CoMP JT, then the size of the transmission set is usually two or three cells (or if it is decided that an optimum size of the transmission set is one, then UE is not served by CoMP JT momentarily). In exchange for consuming resources at every cell in the transmission set, the combined channel quality is much better than in the case of single cell transmission, not only due to extra signal power but also due to less inter-cell interference. The same is true for MU CoMP JT, with the exception that multiple UEs are scheduled on the same radio resources (at multiple cells); the precoding matrix is calculated so that cross-interference between the UEs is eliminated with the help of multiple antennas.

It is beneficial to apply DCS and JT to the cell edge UEs only, where the higher gain from better channel quality outweighs the drawback of allocating air interface resources at multiple cells and increased backhaul load. Provided that its requirements are met, JT is more efficient than DCS, because instead of muting certain radio resources at other cells in order to eliminate the inter-cell interference, it turns the signals from other cells into useful signals while reserving the same amount of resources. The reception of multiple signals at UE in case of JT may be coherent or non-coherent. The former means that the signals received by UE arrive in-phase whereas in-phase reception is not guaranteed in case of the latter. While coherent signals provide better signal quality and spectral efficiency, they require very accurate synchronization of eNBs. MU CoMP JT is much more efficient than SU CoMP JT but it is only possible if the reception is coherent.

The large variety of different alternatives for CoMP defined by 3GPP offers different levels of cooperation. Those alternatives that enable increased levels of cooperation are able to achieve higher spectral efficiency gains, but are feasible only in the case of low system latency and accurate time and frequency synchronization. Additionally, they increase the load on the X2 interface and on an underlying transport infrastructure. In contrast, CS/CB is based on a low level of cooperation and it is relatively easy to implement since it does not require user plane changes but it has less cell edge performance gain than JP. DCS enables much faster transmitting cell changes than legacy handovers, and thereby improves the cell edge performance, but it requires the user data to be present at multiple cells and requires synchronization of each cooperating cell. Non-coherent JT requires more accurate synchronization than DCS and coherent JT requires even further accuracy, which may require high precision reference clocks in each eNB. However, coherent JT offers by far the best gain in spectral efficiency.

Regarding CoMP, the term cell is generally used for a sector of one eNB, therefore the same terminology may be used herein. If the cooperating cells are sectors of the same eNB, then the scenario may be referred to as intra-site intra-eNB CoMP. If one eNB controls remote radio heads (RRH) or remote radio units, and its cells cooperate with the cells of the remote radio heads/units, then this may be referred to as inter-site CoMP, but it is still intra-eNB CoMP. If the cooperating cells belong to separate, independent eNBs, it may be referred to as inter-eNB CoMP.

In case of intra-site CoMP, the cooperation is performed among the cells of the same eNB, therefore intra-site CoMP does not impose any extra requirements on a backhaul. If eNB controls remote radio heads/units, then high capacity, low latency links between eNB and the remote radio heads/units—sometimes referred to as a fronthaul—are inherently necessary to be able to forward a large amount of physical layer level data required for efficient operation. Likewise, the proper operation of inter-eNB CoMP may be possible only if strict latency requirements on the X2 interface connecting the involved eNBs are guaranteed. These requirements may apply at least to signalling and control information that is exchanged by each CoMP alternative, since the up to date CSI which is collected separately by eNBs from the served UEs is to be shared among the cooperating eNBs within a few milliseconds. Additionally, DCS and JT require the distribution of the user data from the serving eNB (which terminates the S1 interface) to the involved eNBs. Similar to the control information, the user plane data needs to be available in time for efficient scheduling over the air interface. This is possible if there is enough bandwidth available for X2 traffic, that is, the access links are capable of handling the extra load. Provided that the backhaul requirements (latency and bandwidth) are met, inter-eNB CoMP may be applied in legacy topologies to increase cell edge performance.

Existing CoMP solutions generally either do not consider backhaul requirements at all, or require the backhaul to be capable of carrying large amounts of data within a strict time frame. Due to these strict latency requirements, at the current stage of development X2 based CoMP JT is not considered as a realistic alternative due to the need for the fast exchange of potentially large amounts of data.

An exemplary embodiment applies to an LTE-A system which implements a DL inter-eNB JT CoMP feature. While LTE-A systems otherwise have very little traffic between eNBs (on the X2 interface), inter-eNB CoMP JT generates a significant eNB to eNB load on the access network with very strict latency requirements, which may not be met by legacy topologies. An exemplary embodiment addresses this issue, and proposes a method with significantly relaxed backhaul requirements in terms of the data amount to be transferred with low latency, and in terms of reduced overhead compared to the available CoMP JT solutions. An exemplary embodiment does not require changes to UEs, air interface, the core network, or the S1 interface between eNBs and the gateway node. Changes are made only to the cooperating eNBs, these changes may be transparent to any CoMP JT supporting UE which connects to a network. An exemplary embodiment enables separating the large volume of user plane traffic to be carried over the X2 interface from the control plane data with the very strict delay requirements which may be guaranteed with prioritization. Prioritization and traffic differentiation through mechanisms such as those applied by differentiated services (DiffServ) and multi label protocol switching-traffic engineering (MPLS-TE) are common capabilities of today's transport networks. On the other hand, the proposed completely distributed and opportunistic architecture minimizes the extra load on the backhaul network. The deployment costs of CoMP JT are reduced due to the relaxed backhaul requirements and reduced overhead, fiber-optic last mile links are not required, instead copper wire or microwave backhaul links may be used. Additionally, the solution does not require the deployment of direct transport links connecting eNBs within the cooperating set, i.e. multi-hop X2 transport connections are tolerated. An exemplary embodiment extends the applicability of inter-eNB CoMP JT, and allows the configuration of larger cooperating sets, thus enabling increased CoMP efficiency. An exemplary embodiment may be a key enabler of inter-eNB CoMP JT in case of legacy backhaul topologies.

Despite its spectral efficiency which provides the highest achievable gain, inter-eNB CoMP JT has been so far considered more than challenging due to its strict backhaul requirements whenever data is to be carried over the X2 interface. In the existing CoMP JT solutions, this data is inflated by overhead, such as RLC (radio link control) and MAC (medium access control) headers, redundant bits due to forward error coding (which is more at the cell edge, where CoMP is to be used) and especially precoding which may inflate the amount of the forwarded data over the X2 interface to multiple times its original size.

The coordination procedure among eNBs is to be faster than the fluctuation of the radio channel quality because the available measured CSI quickly becomes obsolete. From the measurement or estimation of the channel states until the transmission there is a strict time frame. Within this time frame, the cooperating eNBs have to exchange the necessary information (including the CSI), schedule the user data, calculate the precoding matrices, and assemble the data to be transmitted at multiple nodes. It is not strictly necessary, but is useful if this time frame is no more than a single (LTE) subframe of 1 ms, or if not possible, then only a few subframes. Due to the limited and costly transport and backhaul resources, there is a tradeoff to reduce the size of the cooperating sets and restrict the CoMP deployments to network segments where the topology has enough redundancy. However, the reduced size of the cooperating sets and the limited deployment scenarios diminish the potential benefits.

An exemplary embodiment proposes an improvement to inter-eNB CoMP JT.

To coordinate the transmission of multiple cells, several different CoMP architectures have been proposed, with different solutions for information exchange on the backhaul. The solutions may be divided into two distinct categories: 1) centralized precoding based solutions and 2) distributed precoding based solutions.

1) In case of centralized precoding based solutions, PDCP (packet data convergence protocol), RLC, MAC and physical layer processing, including the very last step, precoding are performed at one node (the central unit (CU)), and then an identical transmission signal is quantized and distributed over the backhaul. This quantization may be done either in time or frequency domain, and may be done with common public radio interface sampling. Alternatively, it is also possible to forward analogue radio frequency signals over fiber-optic cables, this may be referred to as radio-over-fiber. In each case with a CU performing the precoding, the transmitting nodes (possibly eNBs) are operated as remote radio heads/units which do not process the transmission data. Though frequency domain quantization is more efficient than time domain quantization, each of these centralized precoding solutions have very demanding backhaul requirements, because precoded data and not raw data is to be transported, resulting in much higher data rates. For example, in centralized precoding MU CoMP JT solutions, due to the very high link capacity requirements, direct dedicated fiber optic connections may be assumed. RRHs may be connected to CU via radio-over-fiber. The difficulty of CoMP over the X2 interface may relates to cases with a base band unit (BBU) and RRHs. Zero delay connections between eNB and remote radio equipments may be assumed when investigates air interface gains.

2) In case of distributed precoding based solutions (i.e. more backhaul efficient group of solutions), the very last step of the processing, the precoding, is not performed immediately. Before the precoding the transmission signal is sent over the backhaul network along with the precoding matrix (which is the only information necessary for the precoding). Transporting the transmission signal over the backhaul before precoding generates much less extra traffic load than transporting the precoded signals, though both methods transport forward error coded data. In this case the precoding is done separately at every eNB in the transmission set, therefore this solution is referred to as distributed (or in some cases decentralized) precoding. Though distributed precoding is much more efficient than centralized precoding, both of these existing solutions generate large chunks of data that are to be transported within a strict time frame. Sending raw data along with precoding info may be more efficient than a centralized encoding scheme, and therefore a distributed scheme may be considered, taking into account link delays but not considering congestion on the links since optical links are assumed. Ring and star backhaul topologies are compared, and the topology may be a combination of ring and star topologies which provides low latency connections over a large area with few additional connections. In a backhaul signaling of a CoMP architecture the user data along with the precoding matrix may be sent over the backhaul after CSI is obtained. A distributed method notes that the transmission delay over the X2 may degrade performance. A backhaul architecture may involve a method to decrease latency for optical backhaul networks.

A mathematical comparison between centralized and local (i.e. distributed) encoding considers the availability of codebook information and shows that central encoding with no codebook information is an attractive option. A quantitative comparison of the user throughput gain may use different optimization algorithms and extra backhaul bandwidth in case of a centralized and a decentralized scheme. It is concluded that the normalization of the precoding matrix to a per-base-station power constraint is better if it is performed over each user and sub-carrier than if it is performed for each sub-carrier. An optimization method under a constrained backhaul is proposed. The required backhaul bandwidth depends on the actual JT user traffic in case of the decentralized scheme but not in case of the centralized scheme. A mathematical comparison of architecture alternatives are referred to as unquantized message based cooperation, quantized message based cooperation, and distributed antenna system is given, which concludes that a system should adapt its method of cooperation according to channel conditions. A procedure for a centralized system with RRHs also involves the possibility of coordination across CoMP clusters.

Even though the distributed precoding solutions are much more backhaul efficient than the centralized precoding solutions, they still have strict backhaul capacity requirements. The extra backhaul traffic on the X2 interface generated by CoMP JT may even exceed the amount of S1 traffic on the concerned links. This data forwarded over the X2 includes the overhead of the radio protocols used on the air interface. The largest overhead is that of forward error coding, which is especially large if UE is at the cell edge. This data is forwarded to possibly not one but two other eNBs, this case implies twice the X2 load.

An alternative approach involves that user data (PDCP service data units (SDUs) are stored in each transmission point of a mobile station. This approach assumes that all transmission points receive the raw data from the serving gateway (SGW) across the S1 interface as well. Furthermore, coordination information is to be sent from a "master" cell to "slave" cells. However, existing suggestions provide no further details.

In contrast, an exemplary embodiment considers data distribution on the X2 interface, not multicasting on the S1.

Macro diversity may be achieved and MAC layers of different eNBs may be considered to be synchronized, and the same user data may be available at multiple eNBs. However, if macro diversity is applied across sites MAC synchronization needs to be achieved over the S1 and X2 interfaces. How this may be efficiently ensured is not disclosed in existing suggestions.

CoMP JT is the most spectrally efficient of the CoMP alternatives, however, a drawback of extending it to inter-eNB cases is the requirement for large backhaul capacity and low latency, which limits its use to scenarios where the backhaul access network is fiber-optic.

An exemplary embodiment addresses this issue and offers a solution which minimizes the backhaul load and has more lenient latency requirements. It enables CoMP JT to be coordinated over the X2 interface, and allows the use of multi-hop, copper wire, or wireless point-to-point links. Though transferring CSI from eNB to eNB within a strict time frame is unavoidable, contrary to the methods referenced above, an exemplary embodiment shows that it is not necessary to transfer large amounts data within this time frame. If less data is to be transferred within the strict time limit, then lower backhaul data rates are required, which decreases the required X2 transport capacity and thus the cost of the mobile backhaul. An exemplary embodiment transfers the user plane data with minimal overhead (after header compression but before forward error coding and precoding) whereas the amount of the control-plane data necessary for the synchronization is much less than the gain on the user plane data.

An exemplary embodiment involves a method for backhaul efficient inter-eNB coordinated multipoint transmission. A challenge of performing DL CoMP JT over the X2 is that it imposes a strict X2 latency requirement and requires high transport bandwidth due to the large amounts of data to be transferred. An exemplary embodiment discloses a method which allows much more lenient X2 latency requirements and generates a reduced amount of additional X2 traffic.

An exemplary embodiment defines the following administrative sets over the CoMP capable eNBs (see FIG. 4):

LTE-A eNBs are selected to form cooperating sets. The selection is done during the planning/configuration process, member eNBs of the cooperating set do not change during system operation (unless reconfigured by the network operator). The members of the cooperating set exchange information including CSI, DL user data and control messages required for proper CoMP operation as specified below.

The set of eNBs that simultaneously transmit to a given UE is referred to as the transmission set. The members of the transmission set are selected dynamically from the cooperating set, that is, the transmission set is a subset of the cooperating set. There may be multiple transmission sets at the same time within one cooperating set, one eNB may be selected to one or more transmission sets.

These eNBs may take on the following roles:

Serving eNB: Every UE is attached to the serving eNB which receives the DL traffic from S1, and receives the UL traffic from UE and forwards it to S1. The serving eNB performs each PDCP, RLC and MAC layer task related the served UE. The serving eNB of UE is changed with the legacy handover process. The solution proposes that this eNB instructs other eNBs from the transmission set to allocate radio resources for its own UEs, and sends them the DL user data to be transmitted and instructions necessary for coordinated transmission.

Figure 4:
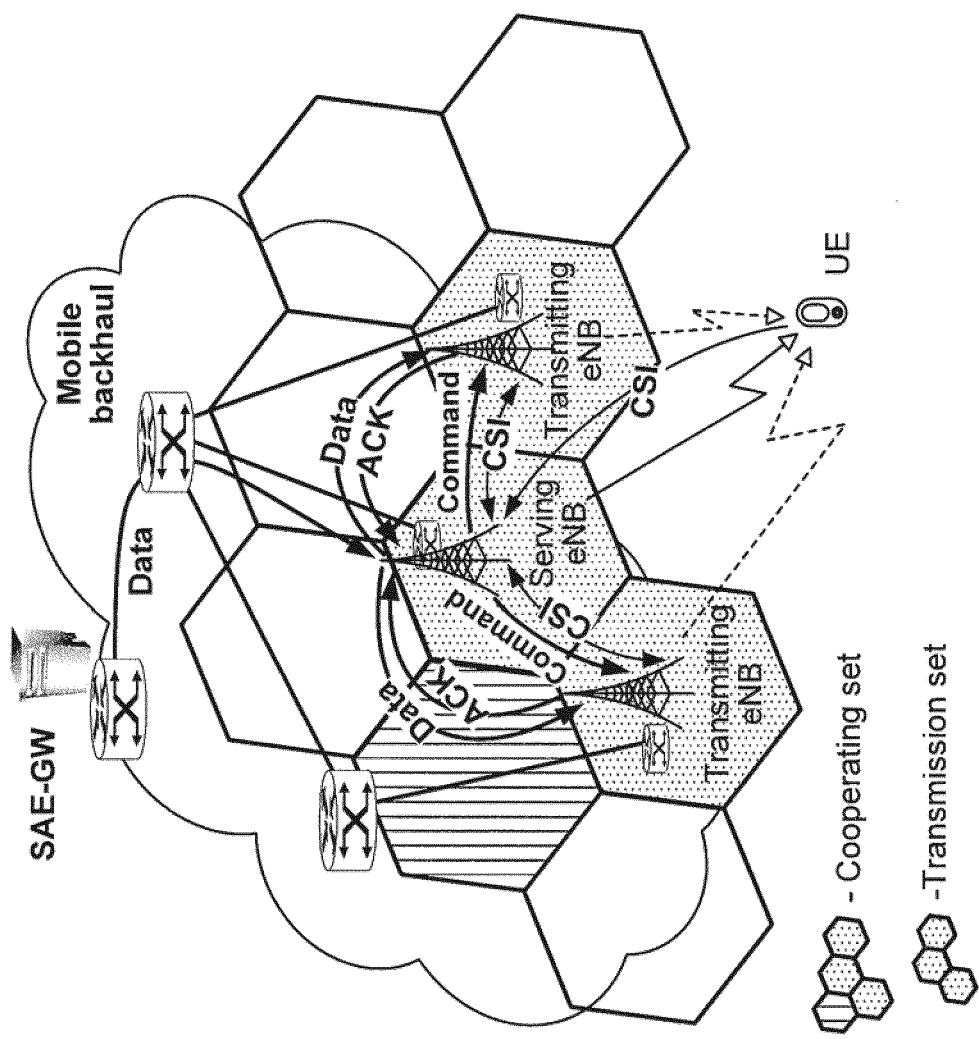
FIG. 4 illustrates administrative sets and roles.

Transmitting eNB: eNB within the transmission set which transmits with CoMP JT to UE whose serving eNB is a different eNB. It receives DL user data and instructions necessary for transmission from the serving eNB of UE. For a given UE, each eNB within the cooperation set which is not its own serving eNB, is a potential transmitting eNB.

eNB may be the serving eNB of multiple UEs and at the same time it may be the transmitting eNB for multiple other UEs. FIG. 4 illustrates administrative sets and roles. Note that CSI is forwarded to each eNB within the cooperating set (not shown in FIG. 4 for the sake of simplicity).

An exemplary embodiment proposes a new agent, a CoMP management agent (CoMP-MA) which is a software entity running on or attached to each eNB participating in the CoMP transmission. The role of CoMP-MA is execution, control and coordination of CoMP JT; within the context of a given UE which receives the joint transmission, CoMP-MA residing at its serving eNB is a serving CoMP-MA whereas the CoMP-MAs at the transmitting eNBs are transmitting CoMP-MAs. CoMP-MA is transparent to UEs, that is, the solution does not require special communication mechanisms between UE and eNBs except the standard LTE-A procedures.

UEs attached to eNBs within one cooperating set periodically report CSI to their serving eNB. The serving CoMP-MA collects these CSIs and forwards them to each eNB within the cooperating set. Based on the content of CSI, the serving CoMP-MA identifies one or more dominant interferers and selects them as potential candidates for transmitting eNBs of UE. As UE moves and the coverage conditions change, new candidate transmitting eNBs may be selected while others may be dropped from the list. As the transmitting eNB selection criteria is the same at each eNB within the cooperation set, based on the content of the received CSIs, CoMP-MA at the candidate transmitting eNBs may also predict if eNB is to be selected as the transmitting eNB in the next round or not.

UEs are selected for CoMP JT according to their CSI reported to the serving eNB, if there are eNBs from the cooperating set that may take part in the joint transmission and there is enough user data in the UE's PDCP buffer(s) at the serving eNB side. The latter condition ensures that the data is able to arrive in time to the transmitting eNBs, i.e. at the time when the user data is conveyed to the lower layer protocol for air interface scheduling at the serving eNB, it should also be available at the eNBs participating in the joint transmission. Accordingly, CoMP-MA monitors the PDCP buffers of UEs and estimates the waiting time based on the measured PDCP throughput and the queue length. UE is selected as eligible for joint transmission if the estimated waiting time exceeds a predefined high threshold. When the selection criteria are met for a given UE, the serving CoMP-MA initiates the CoMP JT procedure; it starts to forward PDCP PDUs of UE starting with the first one in line with an estimated waiting time above the high threshold and sets the status of UE to joint transmission. Only those PDUs are forwarded that are stored after the one at which the forwarding was started, or have arrived since then. PDUs are forwarded until the estimated waiting time drops below a predefined low threshold.

Upon reception of the first forwarded PDCP PDU over the X2 interface belonging to UE recently selected for joint transmission by UE's serving CoMP-MA, CoMP-MA at a candidate transmitting eNB creates the bearer context at eNB for UE and stores the received PDUs in the corresponding PDCP buffer. Each received PDCP PDU is acknowledged without any delay in case the transmitting eNB is capable of handling the joint transmission to UE, otherwise no acknowledgement is sent.

Besides signaling that the data has been received, the acknowledgement of the received PDCP PDUs has a dual purpose. On one hand, this is used by the serving CoMP-MA to reduce the X2 overload by sending the control information required for the air interface scheduling only to those transmitting eNBs that have confirmed the reception of the user plane data. On the other hand, by measuring the time spent between sending PDCP PDU and receiving the corresponding acknowledgement, i.e. X2 RTT, the serving CoMP-MA may adjust the high and low thresholds of the PDCP buffers it controls except for those PDCP buffers that belong to UEs already included in joint transmission. Accordingly, RTT measurements for a given X2 interface are aggregated into a common high and low threshold. When the radio information required for air interface scheduling becomes available, i.e. the scheduler allocates the radio resources to UEs and PDCP PDUs are handed over to the RLC and MAC layers, the serving CoMP-MA extracts the radio resource allocations, RLC and MAC headers, references to the included user plane data, and precoding matrices from the corresponding protocol entities and forwards them to those transmitting eNBs that have acknowledged PDUs. At the other side the transmitting CoMP-MA prepares the data for air interface scheduling and eventually schedules it to UE according to the command(s) received from the serving CoMP-MA.

Figure 5:
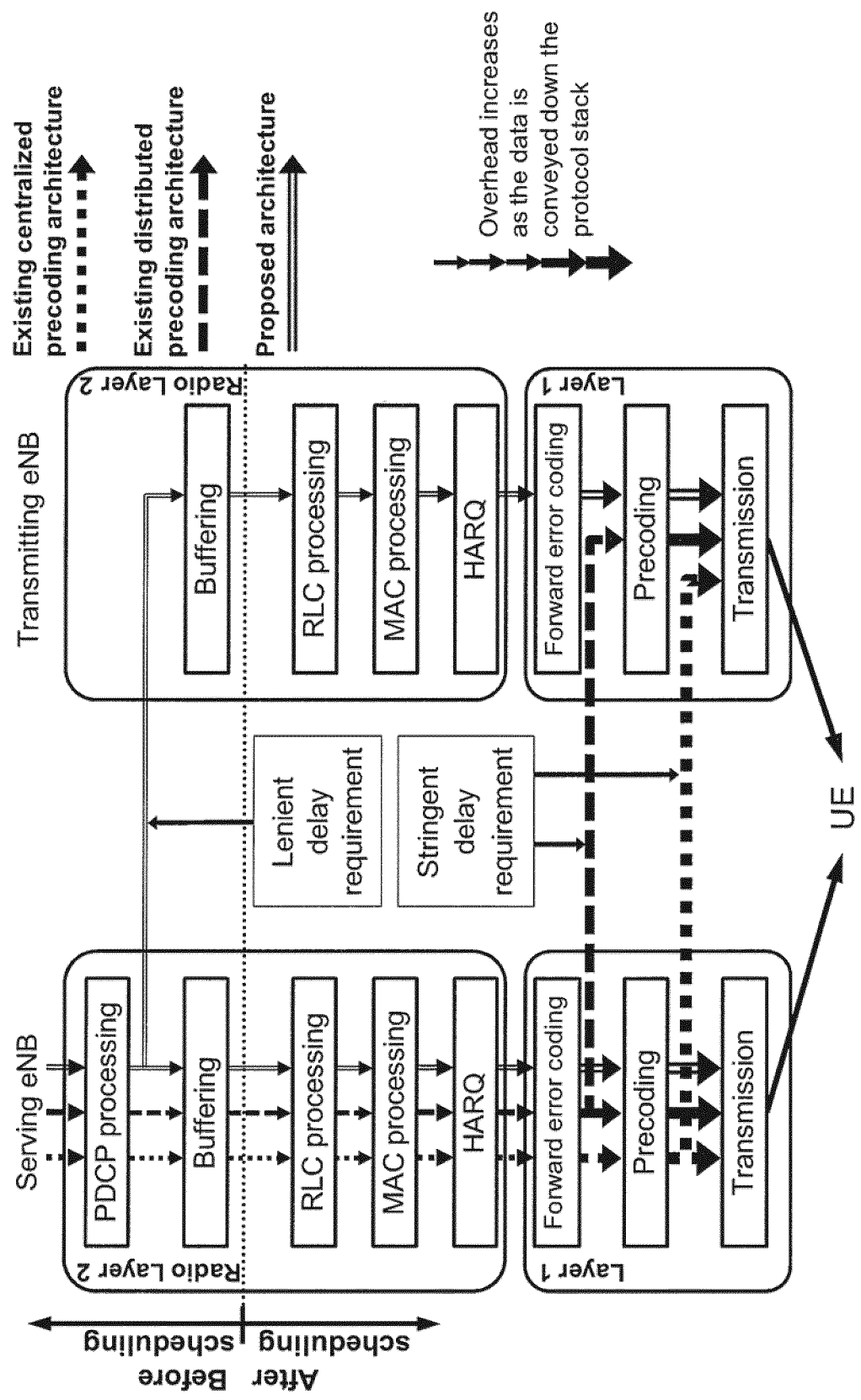
FIG. 5 shows a comparison of user plane data paths.

An exemplary embodiment decouples the user plane data forwarding (which due to in advance forwarding over the X2 interface may be sent under relaxed delay requirements) from the control information that is to be forwarded in a timely manner. The delay requirement for the user plane data is defined by the high threshold, which is dynamically adapted to the actual conditions detected at the X2 interface, thus the data becomes available at the selected transmitting eNBs. The decoupling and the distributed precoding and forward error coding reduces the CoMP JT overhead as it does not require the forwarding of the precoded user plane data inflated with the redundant forward error coding information, etc. The restriction of sending the control information to only those transmitting eNBs that have correctly received the PDCP data further reduces the overhead and the requirements on the X2 interface bandwidth, thus an exemplary embodiment requires limited X2 resources compared to existing solutions but is still able to harvest the air interface efficiency benefit of CoMP JT. The additional load caused by the acknowledgement is not significant as only a reference to the sequence number of the acknowledged PDCP PDU and to UE is to be transferred. An exemplary user plane data path is compared with existing solutions in FIG. 5.

Figure 6:
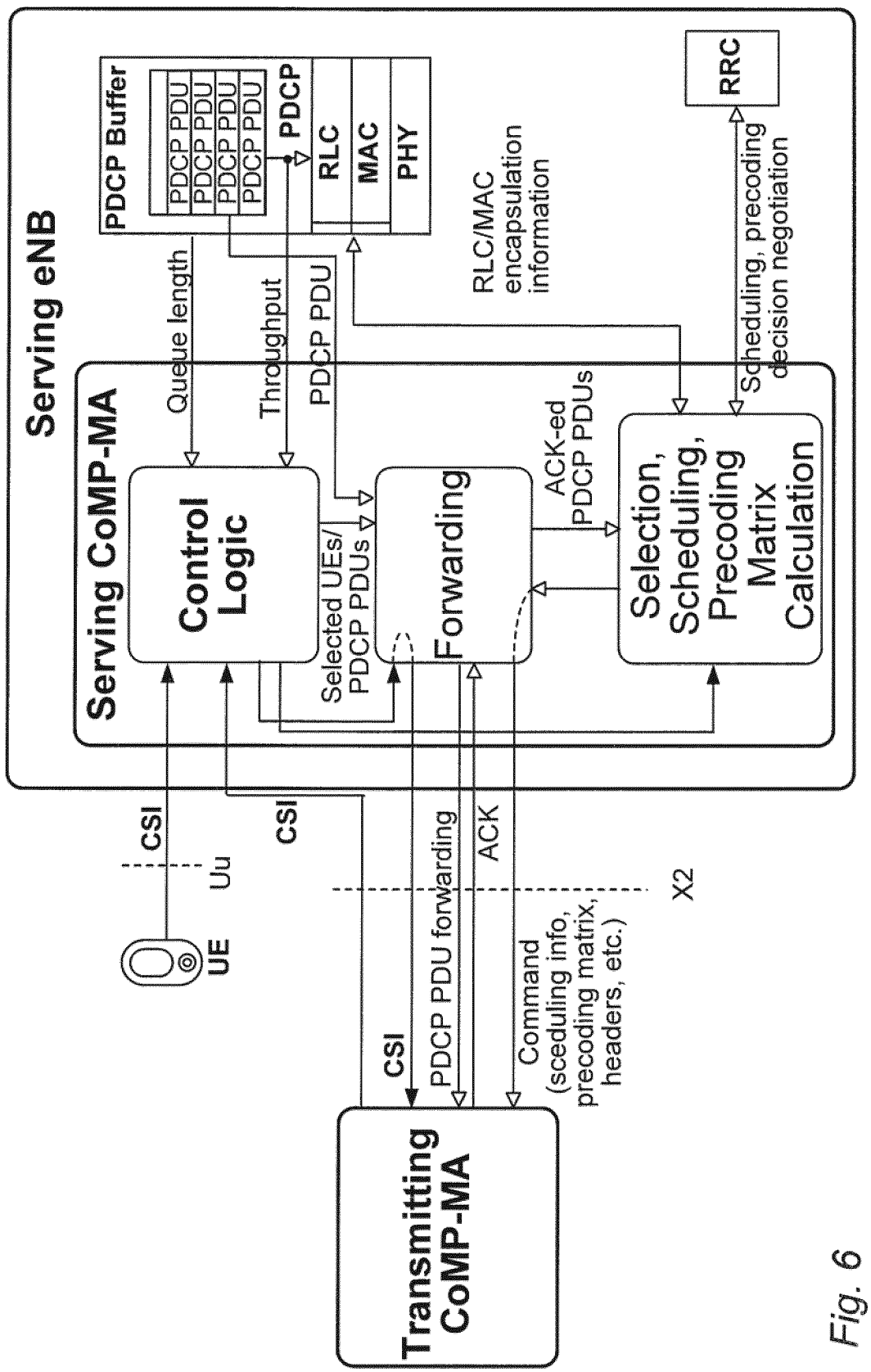
FIG. 6 illustrates an architecture of a serving CoMP-MA according to an exemplary embodiment.

The master of the CoMP JT is the CoMP-MA which is a cross-layer entity running at or attached to each eNB participating within the cooperating set. CoMP-MA has two modes of operation: it acts as the serving CoMP-MA for the UEs served by the eNB the CoMP-MA is attached at; and it acts as the transmitting CoMP-MA for UEs that receive joint transmission but for which the serving eNB is a remote one. FIG. 6 illustrates an exemplary architecture of the serving CoMP-MA.

The serving CoMP-MA may have following functionalities: a control logic, a forwarding entity, and a CoMP scheduling entity.

The control logic collects CSIs reported by UEs attached to eNB and those forwarded (over the X2 interface) by the other eNBs within the cooperating set; monitors the buffer status and measures the PDCP PDU throughput of each active UE; and pre-selects UEs that are to receive joint transmission based on their reported CSI and queue length. CSIs collected from UEs are filtered and forwarded to each eNB within the cooperating set by the forwarding entity. The identity of UEs pre-selected for joint transmission and a sequence number of the first forwarded PDCP PDU of the pre-selected UE is passed to the forwarding entity. Similarly, the control logic notifies the forwarding entity to cease forwarding PDCP PDUs of the given UE by indicating the identity of UE that was de-selected and the sequence number of the last PDCP PDU to be forwarded. Finally, the control logic forwards CSI (both collected over the X2 and Uu interface) to the CoMP scheduling entity.

In order to reduce the X2 interface load, CSIs received through the Uu interface (i.e. reported by UEs) are filtered to select only those UEs that have data in their PDCP buffer waiting to be forwarded over the air interface. As it is reasonable to assume that in the next scheduling round, only these UEs might receive air interface resources, CSIs reported by the other UEs are not relevant. The filtered CSIs are then forwarded over the X2 interface. Note that in time division duplex (TDD) systems, CSI may be estimated at eNB by exploiting channel reciprocity, or if UL CoMP is used and UE is able to report CSI to multiple eNBs simultaneously, then this CSI forwarding procedure is simplified, but the method according to an exemplary embodiment may still be used with the necessary modifications.

The pre-selection of UEs for joint transmission is done in two steps: first, the candidate UEs (and their candidate transmitting eNBs) are identified which are eligible for CoMP based on their CSIs (from the whole UE population attached to eNB with active bearers), whereas in the second step the pre-selection is completed by evaluating the status of the candidate UE's PDCP buffer. The selection criteria of the first step is based on a following consideration: at the cell edge where interference from the other cells is high, it is spectrally very efficient to serve UE with joint transmission, unlike at a cell center. CSI reported by UEs is used to decide whether the joint transmission is efficient or not and to identify the candidate transmitting eNBs. As CSI changes, eNBs may be pre-selected or de-selected for potential transmission. Only eNBs within the same cooperating set may be pre-selected as transmitting eNB candidates. In the second step, the candidate UEs are pre-selected for joint transmission if they have PDCP PDUs waiting in UE's PDCP buffer with an estimated waiting time that exceeds the predefined high threshold. Accordingly, the control logic measures the PDCP PDU throughput and the amount of PDCP PDU data waiting for transmission within the PDCP PDU buffer upon the arrival of a new PDCP SDU. Based on these measurements, the waiting time of the new PDCP PDU may be estimated. In case this waiting time is above the high threshold for a candidate UE, UE is pre-selected by the control logic, its identity together with the sequence number of PDCP PDU with an estimated waiting time above the high threshold and the list of the candidate transmitting eNBs for UE are sent to the forwarding entity. The forwarding entity starts to forward PDCP PDUs with equal or higher sequence numbers (i.e. the given PDU, those that are beyond it and those that arrive later on are forwarded) from the PDCP buffer of the pre-selected UE to the candidate transmitting eNBs. The role of the high threshold is to optimize the X2 interface load by restricting the joint transmission to those candidate UEs that have loaded PDCP buffers, i.e. it is plausible to assume that a reasonable gain may be achieved by including them in the joint transmission. Additionally, starting the forwarding with the PDCP PDUs beyond the high threshold relaxes the delay requirement on the forwarded data, that is, PDCP PDUs to be delivered via the joint transmission are sent before the estimated scheduling time with a timing advance that equals the high threshold. The value of the high threshold is dynamically updated based on the RTT measurements provided by the forwarding entity. UEs are de-selected in case according to their reported CSI no gain may be achieved through joint transmission or in case the waiting time of their PDPC PDUs drops below the low delay threshold.

The forwarding entity collects an acknowledgement for each forwarded PDCP PDU in order to measure RTT over each X2 interface and to exclude those candidate transmitting eNBs from the CoMP scheduling that have not acknowledged the forwarded PDCP PDUs of a pre-selected UE in time. The individual RTT measurements for each X2 interface are aggregated into a per X2 interface RTT as a weighted sum and transferred to the control logic. Based on these measurements, the control logic updates the high and low thresholds: the high threshold is set to twice the average X2 interface RTT, whereas the low threshold to the maximum measured RTT. In order to prevent oscillations, the thresholds of UEs that are participating in the joint transmission are not updated. Received acknowledgements indicate that a candidate transmitting CoMP-MA has received the data to be delivered in the joint transmission. If no acknowledgement is received in time, the serving CoMP-MA does not schedule eNB for transmission, and does not send it a scheduling command. This mechanism improves X2 resource usage, as it frees X2 of the extra overhead of pointless CoMP scheduling commands, that is, those eNBs are not be scheduled for transmission which possibly are not able to transmit because they may not have received the user data. Accordingly, a timeout timer set to two times the value of the corresponding X2 RTT is started for each forwarded PDCP PDU. The forwarding entity informs the CoMP scheduling entity about unacknowledged PDCP PDUs (together with the required information for accurate identification).

The length of a PDCP sequence number field within a PDCP header may be defined as 5, 7 or 12 bits. It may be necessary to add more sequence number bits, because these PDCP PDUs may need to be unambiguously referenced to coordinate data processing at multiple eNBs. The PDCP layer also employs a timer based packet discard which prohibits PDUs from being queued for too long. eNBs within a cooperating set may be configured with the same discard timer (which of course is set to a value above a maximum allowed X2 interface RTT). This way, copies of forwarded PDCP PDUs may be discarded quasi-simultaneously by the transmitting and serving eNBs, thus the waste of buffering resources is prevented.

The identity of the transmitting eNBs is given to the CoMP scheduling entity by the forwarding entity, i.e. those candidate transmitting eNBs are selected that have acknowledged the corresponding PDCP PDUs. CSI received from the control logic is used in the negotiation (started immediately) with the radio resource control (RRC) to perform a preliminary scheduling. This calculation is performed in parallel at each eNB in the cooperating set based on the mutually available information distributed through the forwarded CSIs and on the same criteria/scheduling mechanism, therefore the result is the same in each eNB. This preliminary scheduling decides which radio resources (PRBs) are allocated for the joint transmission, and which eNBs schedule them. RRC at each eNB uses independently PRBs not allocated for the joint transmission. Each CoMP scheduling entity negotiates with RRC to perform cross-cell scheduling considering only those PRBs that were allocated for the joint transmission and to the transmitting eNB in question. This preliminary scheduling procedure prevents conflicting cross-cell scheduling, i.e. that two eNBs would schedule on the same PRB of the same eNB.

After the cross-cell scheduling, the CoMP scheduling entity calculates the precoding matrices for all the transmitting eNBs based on the reported CSI. The precoding matrices are handed over to the forwarding entity.

When PDCP PDUs are scheduled at the serving eNB, they are handed over to the RLC layer which executes the required protocol operations, e.g. segmentation, encapsulation, etc., and then forwards the resulting RLC PDUs to the MAC layer. MAC processes RLC PDUs and encapsulates them. The assembled MAC PDUs are handed over to the physical Layer, they are transmitted synchronously from each transmitting eNB, until then they are delayed. If UE signals to its serving node that it requires a hybrid automatic repeat request (HARQ) retransmission, the serving eNB immediately forwards the retransmission request to each transmitting eNB within a scheduling command.

There are two types of scheduling commands, one for first transmissions and the other for retransmissions. The scheduling command that orders HARQ retransmissions only includes the reference to UE which requires the HARQ retransmission and a HARQ process identifier, as the transmitting CoMP-MAs already have the necessary data. The content of the scheduling command for the first transmissions is created based on the following considerations.

Figure 7:
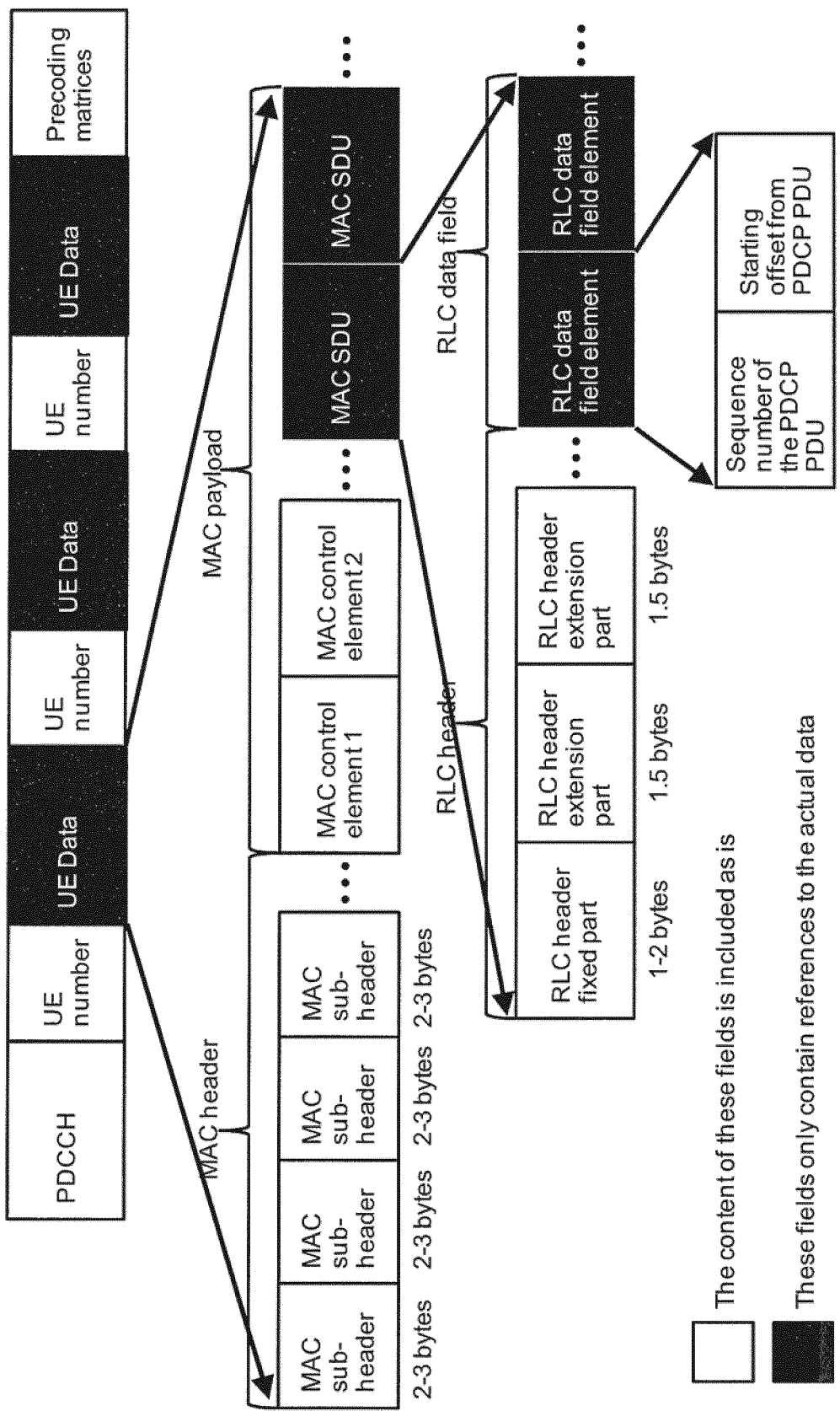
FIG. 7 illustrates information included in a scheduling command according to an exemplary embodiment.

Right after RLC and MAC layer processing, the relevant information (e.g. segmentation, encapsulation information and headers) on the newly generated RLC and MAC PDUs are conveyed to a CoMP scheduling agent which creates a scheduling command for each transmitting eNB. This command is created so that the relevant information that enables the transmitting eNB/transmitting CoMP-MA to create the exact replica of MAC PDUs to be scheduled at the same time is included, plus the information required for physical layer processing. The scheduling command is delivered as high priority data over the X2 interface. The information included in the scheduling command (see also FIG. 7) may be: a) PDCCH (physical downlink control channel) information; b) information necessary for the replication of MAC PDUs; c) precoding matrices.

A PDCCH channel is used in LTE systems to inform UEs on scheduling decisions; it describes the radio resource allocation and the modulation and coding schemes used. Only PDSCH (physical downlink shared channel) data may be transmitted from multiple nodes, while PDCCH is transmitted only by the serving cell. However, each transmitting eNB is to be informed of the specific radio resource allocation and the used modulation and coding schemes in order to synchronize transmission. Therefore, this information, i.e. the PDCCH data is to be forwarded from the serving CoMP-MA to the transmitting CoMP-MAs over X2, along with physical control format indicator channel (PCFICH) information which is necessary for the interpretation of the PDCCH field. Depending on PCFICH, the length of the PDCCH field is 1, 2 or 3 symbols of information for every 15 kHz of useful bandwidth.

For MAC PDU replication, following data may be required (see also FIG. 7): information that enables unique identification of UE; RLC protocol information, MAC headers including subheaders (2 or 3 bytes each) and MAC control elements. The payload of MAC PDU, i.e. MAC SDU contains one RLC PDU. The RLC protocol information is sent in order to reconstruct these RLC PDUs, including:
  status PDUs;
  in an acknowledged mode (AM) and unacknowledged mode (UM), the RLC headers used during the encapsulation, containing a 1 or 2 byte fixed part and possibly an extension part; the length of the extension part depends on the number of data field elements (1.5 bytes per extra data field element, padded to an integer number of bytes).

In a transparent mode (TM), RLC PDU includes one RLC SDU (since there is no encapsulation, no further information is necessary). In AM and UM, every data field element of the RLC PDU includes one RLC SDU or one RLC SDU segment. These RLC SDUs and RLC SDU segments are PDCP PDUs or PDCP PDU segments. To reassemble these PDCP PDUs, the following information may be necessary:
  the sequence number of PDCP SDU, which is the same as the sequence number of the corresponding PDCP PDU. Note that as previously mentioned, the standard sequence number size is 5, 7 or 12 bits, extra bits may need to be used;
  if it is an RLC SDU segment, the starting offset of the scheduled data from PDCP PDU; considering the maximum size of PDCP PDU (8188 bytes plus header), this should be no more than 14 bits (or 2 bytes).

The number of bytes in an RLC data field is indicated in a length indicator field of the RLC header. This determines how many bytes of the referenced PDCP PDU is to be included. The length of the RLC headers is indicated in the extension fields of the RLC header. The length indicator field of the MAC header determines the number of bytes in MAC SDU. The extension fields of the MAC header contain the length of the MAC header.

Based on this information and using PDCP PDUs distributed beforehand, the transmitting CoMP-MAs are capable of creating the exact replica of MAC PDU generated at the serving eNB.

Furthermore, the scheduling command also contains the precoding matrices which are conveyed to the physical layer of every transmitting eNB. The operation of the physical layer (e.g. cyclic redundancy check (CRC) calculation and forward error coding) is identical at every eNB and exactly the same frames are generated. As described above, each eNB multiplies its signals with its precoding matrix to generate the transmission signals to be transmitted at its specific antenna elements.

Since this described information which is necessary for the replication of the MAC PDUs does not contain the actual user data (which was forwarded beforehand), only references to it, it includes less bytes of data than the downlink transmission data. PDCP PDUs are forwarded beforehand with low priority on the backhaul before scheduling, after scheduling when there is a strict delay requirement, only this smaller volume of data is to be forwarded with high priority and low latency. An exemplary embodiment is therefore more resistant to congestion on the backhaul and requires less backhaul capacity.

Figure 8:
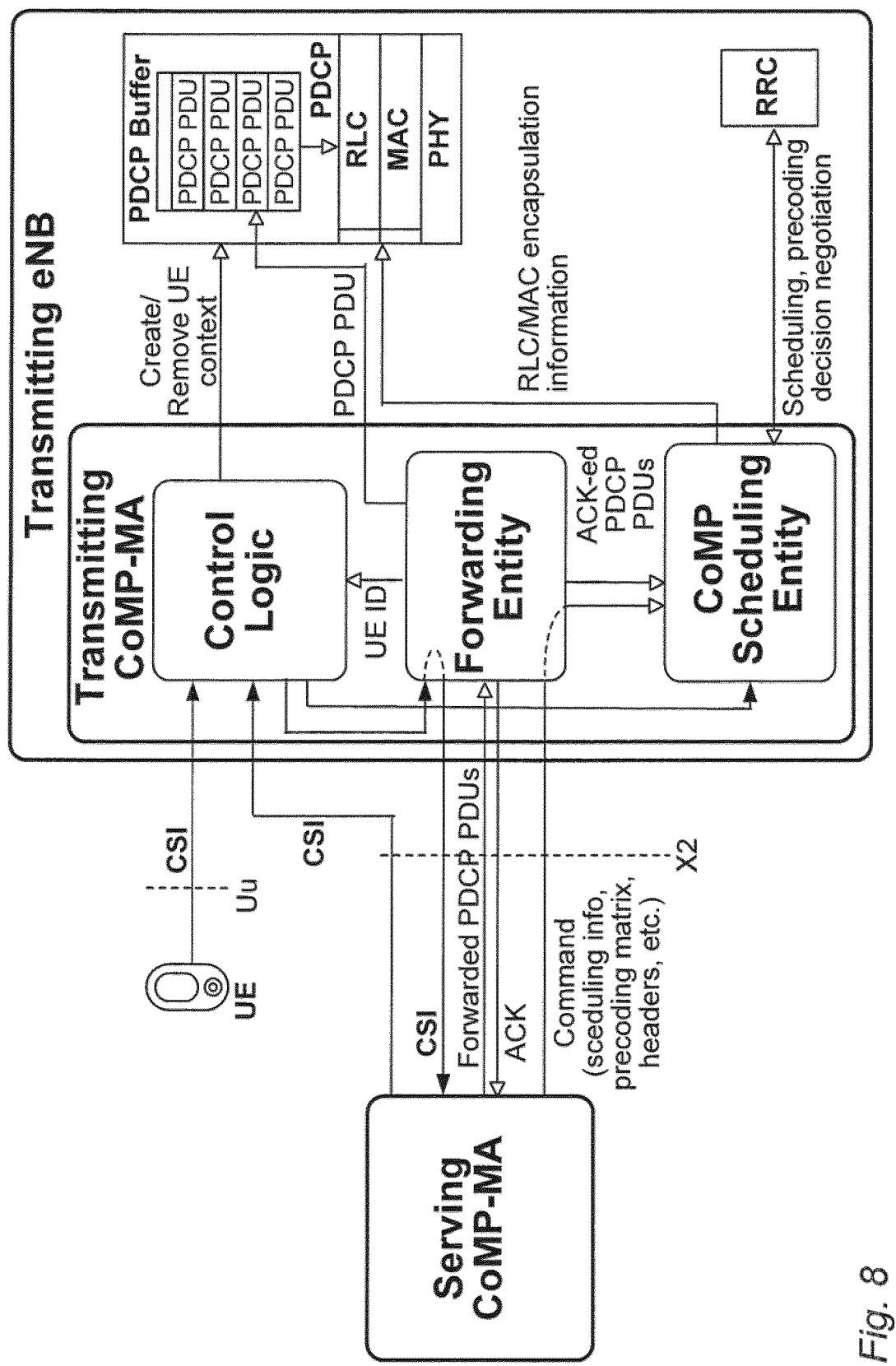
FIG. 8 illustrates an architecture of a transmitting CoMP-MA according to an exemplary embodiment.

FIG. 8 illustrates an exemplary architecture of the transmitting CoMP-MA. The transmitting CoMP-MA may have following functionalities: a control logic, a forwarding entity, a CoMP scheduling entity.

CSIs reported by UEs attached to eNB are collected, filtered and transferred for forwarding (by sorting out UEs with no PDCP PDUs) by the control logic. CSIs received from the cooperating eNBs are also collected by the control logic. Their content is used in order to identify the potential UEs per cooperating eNBs that may be subject to joint transmission. CSIs are passed to the CoMP scheduling entity.

Upon reception of a forwarded PDCP PDU belonging to UE (a tunnel endpoint identifier field of a GTP-U header used in the user plane X2 identifies UE) that is not yet selected for the joint transmission, the forwarding entity acknowledges it without further delay unless there are no resourcing or other restrictions (elaborated below), notifies the control logic by specifying UE ID and waits until the control logic creates a user plane context (e.g. bearer context) for UE. Once the user plane context is created, the forwarding entity forwards PDCP PDUs of UEs to its PDCP buffer. The control logic starts to monitor the context of UE, initiates a guard timer and in case the corresponding CSIs indicate it (e.g. there is no reason for joint transmission to UE based on its own reports) and/or no new PDCP PDUs for UE are received before the guard timer elapses, the control logic removes the context.

The reception of PDCP PDU over X2 from the serving CoMP-MA indicates that eNB has been selected as the transmitting eNB candidate. As discussed above, PDCP PDU is acknowledged only in case eNB is ready for the joint transmission, in which case a receiving forwarding entity immediately acknowledges PDCP PDUs to the serving CoMP-MA. However, if eNB is already overloaded, and has too much data pending transmission, then the transmitting CoMP-MA discards PDCP PDU, in which case eNB does not take part in the joint transmission for UE to which the PDCP PDU belonged to. Depending on the implementation, the control logic may still create the context in case the discarded PDCP PDU belonged to UE previously not served with the joint transmission.

PDCP PDUs may be stored in the PDCP buffer until the scheduling command is received from the serving CoMP-MA.

Note that eNB may be the serving eNB of multiple UEs and at the same time the transmitting eNB of multiple UEs served by other eNBs. Therefore, unless eNB serves no UEs with joint transmission, upon the reception of CSIs from over the X2 interface, the serving CoMP-MA attached to eNB performs pre-scheduling as described above, thereby limiting PRBs available for scheduling for each of UEs. In the event that there are no served UEs with joint transmission, then pre-scheduling is not necessary and the received scheduling commands may freely allocate any of PRBs.

When the scheduling command is received, the forwarding entity in the transmitting CoMP-MA passes the whole command to the CoMP scheduling entity which extracts the relevant information, selects PDCP PDUs indicated in the command and creates the corresponding MAC PDUs that are exact replicas of those created at the serving eNB.

These are passed on to the physical layer along with the received resource allocation information and precoding matrices. The operation of the physical layer is identical at every transmitting node, and at the predetermined time of transmission identical frames are synchronously transmitted.

Figure 9:
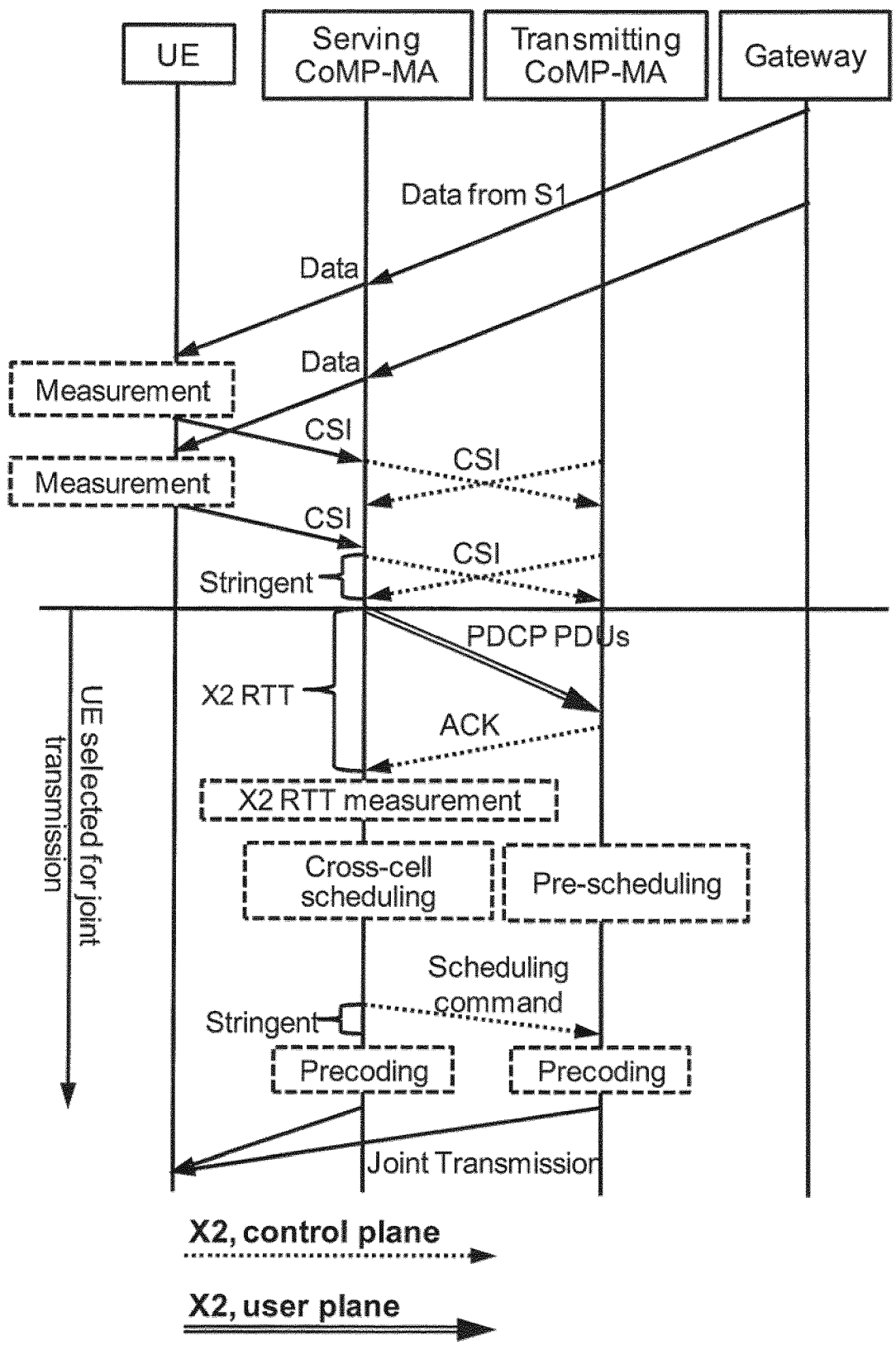
FIG. 9 illustrates an information exchange sequence according to an exemplary embodiment.

An exemplary information exchange procedure is illustrated in FIG. 9. In the exemplary information exchange sequence of FIG. 9, only DL is shown. Until UE is selected for the joint transmission, the data sent from the gateway is received and queued at the serving eNB which transmits to the UE. UE periodically reports its measured CSI to its serving eNB. Whenever the control logic in the serving eNB receives CSI from UE, if UE has data in its PDCP buffer, the forwarding entity immediately forwards CSI to each of the other eNBs in the cooperating set. In parallel, the control logic receives CSI sent from the other eNBs. When UE is pre-selected for the joint transmission, PDUs stored in the PDCP buffer that are to be jointly transmitted are forwarded over the X2 interface by the forwarding entity. When new data is received from the S1 interface, and a new PDCP PDU is generated, it is also immediately forwarded. When the forwarding entity of the transmitting CoMP-MA receives these PDCP PDUs over the X2 interface, provided that the necessary conditions are met, it immediately replies with an acknowledgement. Upon the reception of the acknowledgement, the control logic of the serving CoMP-MA measures the time that has passed since the sending of the corresponding PDCP PDU, this is X2 RTT. Every CoMP scheduling entity which serves at least one UE with the joint transmission periodically performs an identical pre-scheduling. Immediately afterwards, the scheduling entity in the serving CoMP-MA negotiates cross-cell scheduling decisions with RRC. When a cross-cell scheduling decision is made, the scheduling entity immediately assembles a scheduling command which is forwarded to the transmitting CoMP-MAs. When the scheduling entity in the transmitting eNB receives this scheduling command, based on the scheduling command and the previously received PDCP PDUs, the scheduling entity assembles MAC PDUs which are conveyed to the physical layer. Note that if the CSI messages and the scheduling commands sent over the X2 interface are delayed for too long, and if the scheduling command is not received by the time the transmission is to take place, the transmitting eNBs are unable to transmit. This is to be avoided, because this degrades the performance of the air interface and thereby the system performance as well. An exemplary embodiment minimizes the length of the information exchange procedures and sends each of such delay critical messages with higher priority than the bulk data.

Existing inter-eNB CoMP JT solutions require high capacity and very low latency X2 connections that may be provided only in specially designed fiber-optic based mobile backhaul networks making inter-eNB CoMP JT economically infeasible in most legacy network setups. An exemplary embodiment relaxes the requirements on the mobile backhaul and makes it possible to implement inter-eNB CoMP JT also in legacy backhauls. The inter-eNB CoMP JT solution according to an exemplary embodiment uses parameters (e.g. a high threshold and a low threshold for selecting/deselecting a UE as eligible for joint transmission) that may be set and controlled.

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that support coordinated multipoint transmission CoMP. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be ap-plied, an architecture based on LTE-A network elements, without restricting the embodiment to such an architecture, however. The embodiments described in these examples are not limited to the LTE-A radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

Figure 10:
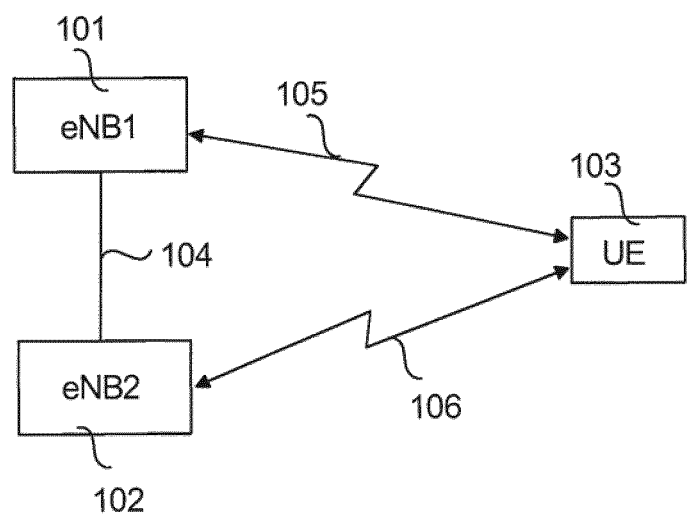
FIG. 10 shows a simplified block diagram illustrating exemplary system architecture.

A general architecture of a communication system is illustrated in FIG. 10. FIG. 10 is a simplified system architecture only showing some elements and functional entities, all being logical units whose implementation may differ from what is shown. The connections shown in FIG. 10 are logical connections; the actual physical connections may be different. It is apparent to a person skilled in the art that the systems also comprise other functions and structures. It should be appreciated that the functions, structures, elements and the protocols used in or for CoMP, are irrelevant to the actual invention. Therefore, they need not to be discussed in more detail here.

The exemplary radio system of FIG. 10 comprises a network node 101 of a network operator. The network node 101 may include e.g. an LTE-A base station eNB1 of a first cell, radio network controller (RNC), or any other network element, or a combination of network elements. The network node 101 may be connected to one or more core network (CN) elements (not shown in FIG. 10) such as a mobile switching centre (MSC), MSC server (MSS), mobility management entity (MME), serving gateway (SGW), gateway GPRS support node (GGSN), serving GPRS support node (SGSN), home location register (HLR), home subscriber server (HSS), visitor location register (VLR). In FIG. 10, the radio network node 101 that may also be called eNB1 (enhanced node-B, evolved node-B) or network apparatus of the radio system, hosts the functions for radio resource management in the second cell of a public land mobile network. The exemplary radio system of FIG. 10 comprises a network node 102 of a network operator. The network node 102 may include e.g. an LTE-A base station eNB2 of a second cell, The network node 102 may be connected to one or more core network (CN) elements (not shown in FIG. 10) such as a mobile switching centre (MSC), MSC server (MSS), mobility management entity (MME), serving gateway (SGW), gateway GPRS support node (GGSN), serving GPRS support node (SGSN), home location register (HLR), home subscriber server (HSS), visitor location register (VLR). In FIG. 10, the radio network node 102 that may also be called eNB2 (enhanced node-B, evolved node-B) or network apparatus of the radio system, hosts the functions for radio resource management in the second cell of the public land mobile network.

FIG. 10 shows a user equipment 103 located in the service area of the radio network node 101, 102. The user equipment refers to a portable computing device, and it may also be referred to as a user terminal. Such computing devices include wireless mobile communication devices operating with or without a subscriber identification module (SIM) in hardware or in soft-ware, including, but not limited to, the following types of devices: mobile phone, smart-phone, personal digital assistant (PDA), handset, laptop computer. In the example situation of FIG. 10, the user equipment 103 is capable of connecting to the radio network node 101, 102 via a (cellular radio) connection 105, 106, respectively. In the example situation of FIG. 10, the radio network node 101 may be capable of connecting to the radio network node 102 via a connection 104.

Figure 11:
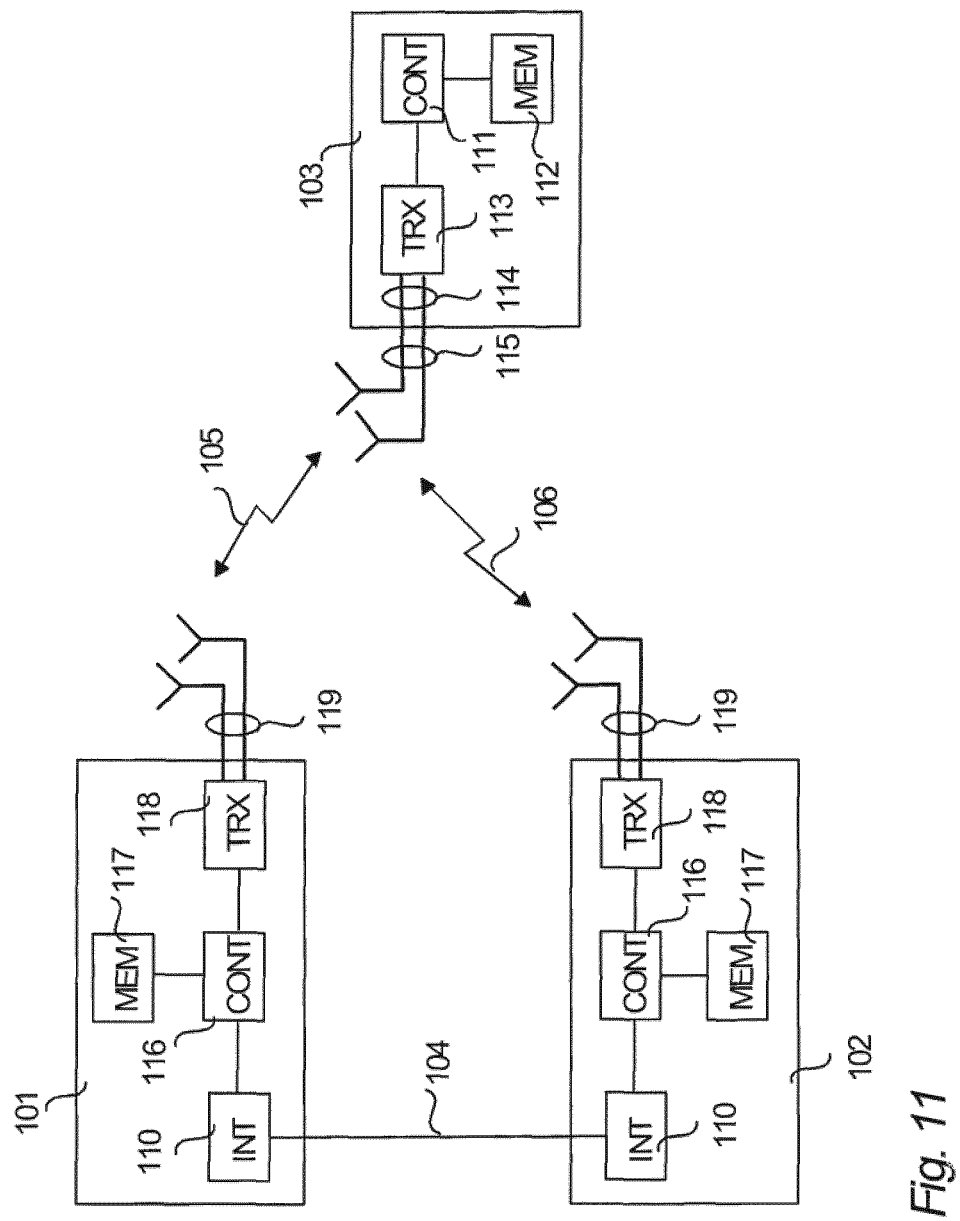
FIG. 11 shows a simplified block diagram illustrating exemplary apparatuses.

FIG. 11 is a block diagram of an apparatus according to an embodiment of the invention. FIG. 11 shows a user equipment 103 located in the area of a radio network node 101, 102. The user equipment 103 is configured to be in connection with the radio network node 101, 102. The user equipment or UE 103 comprises a controller 111 operationally connected to a memory 112 and a transceiver 113. The controller 111 controls the operation of the user equipment 103. The memory 112 is configured to store software and data. The transceiver 113 is configured to set up and maintain a wireless connection 105, 106 to the radio network node 101, 102, respectively. The transceiver 113 is operationally connected to a set of antenna ports 114 connected to an antenna arrangement 115. The antenna arrangement 115 may comprise a set of antennas. The number of antennas may be one to four, for example. The number of antennas is not limited to any particular number. The user equipment 103 may also comprise various other components, such as a user interface, camera, and media player. They are not displayed in the figure due to simplicity.

The radio network node 101, 102, such as an LTE-A base station (eNode-B, eNB) comprises a controller 116 operationally connected to a memory 117, and a transceiver 118. The controller 116 controls the operation of the radio network node 111. The memory 117 is configured to store software and data. The transceiver 118 is configured to set up and maintain a wireless connection to the user equipment 103 within the service area of the radio network node 101, 102. The transceiver 118 is operationally connected to an antenna arrangement 119. The antenna arrangement 119 may comprise a set of antennas. The number of antennas may be two to four, for example. The number of antennas is not limited to any particular number. The radio network node 101, 102 may be operationally connected (directly or indirectly) to another network element of the communication system, such as a further radio network node 101, 102 (via a connection 104), radio network controller (RNC), a mobility management entity (MME), a serving gateway (SGW), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface 110. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 101, 102, 103 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 101, 102, 103 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 112, 117 may include volatile and/or non-volatile memory and typically stores content, data, or the like. For example, the memory 112, 117 may store computer program code such as software applications or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 12:
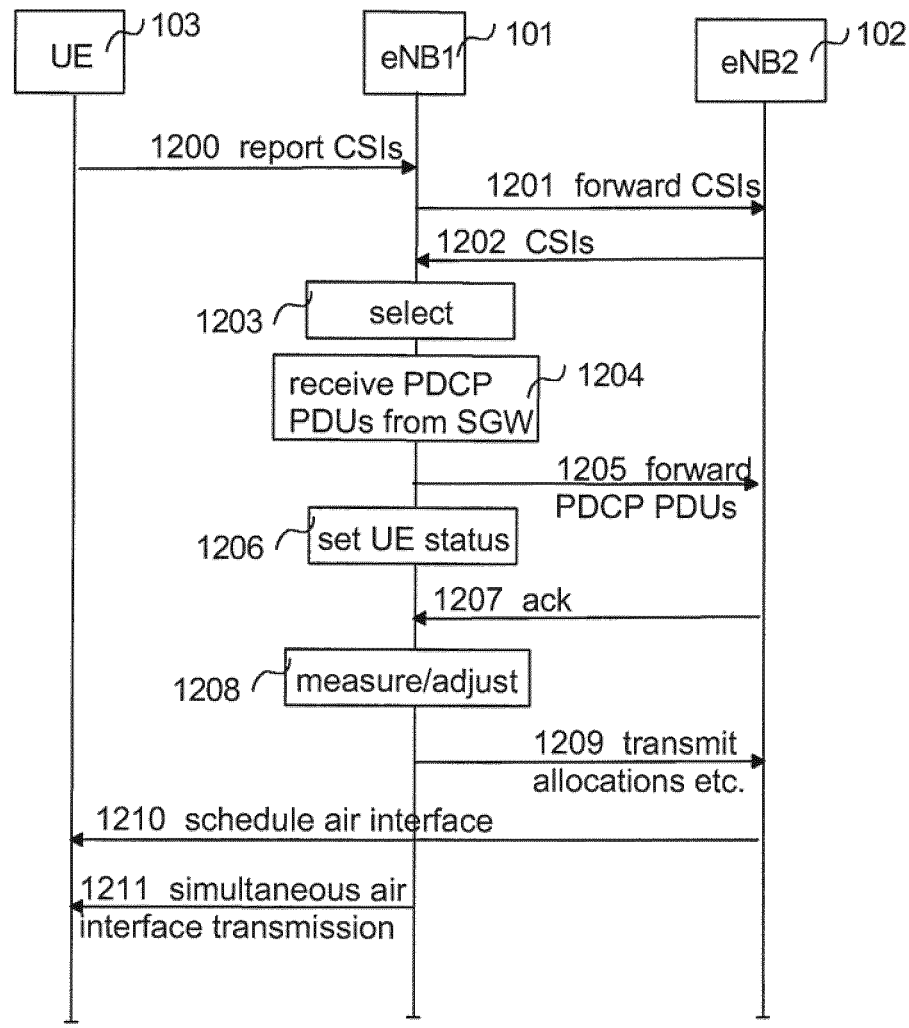
FIG. 12 shows a messaging diagram illustrating an exemplary messaging event according to an embodiment of the invention.

The signalling chart of FIG. 12 illustrates the required signalling. In the example of FIG. 12, a user terminal 103 may, in item 1200, periodically report CSIs to a serving CoMP-MA 101 serving the user terminal 103. The serving CoMP-MA collects CSIs transmitted by UEs, and forwards, in item 1201, the collected CSIs to eNBs 102 within a cooperating set. eNB1 101 may also receive CSIs forwarded 1202 from eNBs 102 for those UEs that are served by eNBs 102. Based on the collected CSIs, the serving CoMP-MA 101 identifies and selects, in item 1203, one or more dominant interferers as potential candidates for transmitting eNBs for a selected UE. In item 1204, the serving CoMP-MA 101 receives PDCP PDUs from SGW. The serving CoMP-MA 101 initiates CoMP joint transmission by forwarding, in item 1205, to the candidate transmitting eNBs 102, the PDCP PDUs received from SGW and buffered for the selected UE 103, and by setting, in item 1206, the status of the selected UE to be CoMP joint transmission. In item 1207, the transmitting CoMP-MA at the candidate transmitting eNB 102 transmits, to the serving CoMP-MA 101, an acknowledgement on PDCP PDUs received in a candidate transmitting eNB 102 in case the candidate transmitting eNB 102 is capable of handling the CoMP joint transmission to UE. Based on the acknowledgement, the serving CoMP-MA 101, measures 1208 the time spent between forwarding PDCP PDU to eNB2 102 and receiving the corresponding acknowledgement in eNB1 101. Based on the measurement, the serving CoMP-MA 101 adjusts 1208 a high threshold and a low threshold of predefined PDCP buffers of the serving CoMP-MA 101. In response radio information required for air interface scheduling becoming available, the serving CoMP-MA 101 extracts 1208 radio resource allocations, RLC and MAC headers, references to user plane data included, and precoding matrices from corresponding protocol entities, and forwards 1209 the extracted radio resource allocations, RLC and MAC headers, references to the user plane data included, and precoding matrices to the transmitting eNBs 102 that have acknowledged PDCP PDUs, in order the transmitting CoMP-MA to be able to prepare for air interface scheduling for UE 103. In item 1210, the transmitting CoMP-MA schedules the air interface for UE 103/performs air interface transmission to UE 103. Item 1211 illustrates simultaneous air interface transmission (CoMP-JT) transmitted from eNB1 101 to UE 103, which is simultaneous with the transmission 1210 from eNB2 102.

Figure 13:
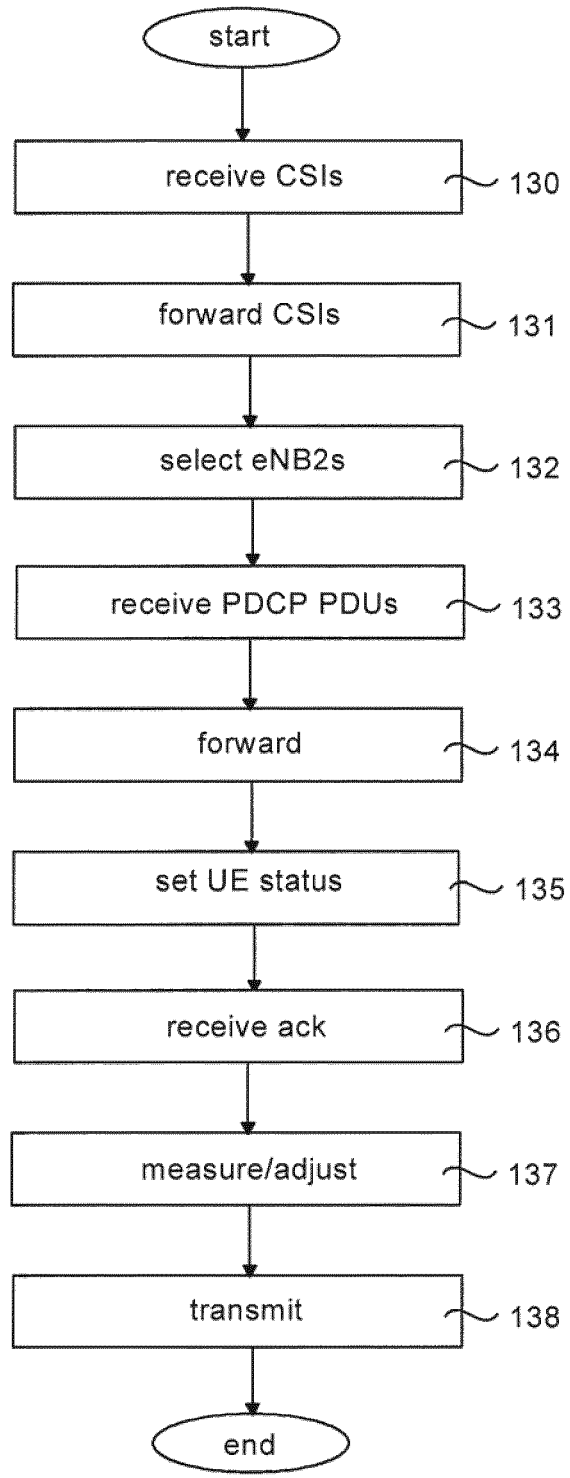
FIG. 13 shows a schematic diagram of a flow chart according to an exemplary embodiment of the invention.

FIG. 13 is a flow chart illustrating an exemplary embodiment. The apparatus 101, which may comprise e.g. a network element (network node, e.g. a LTE-A-capable base station (enhanced node-B, eNB1) of a first cell) may, in item 130, periodically receive reported CSIs by UEs. In item 131, the collected CSIs may be forwarded to eNBs 102 within a cooperating set. (In item 130, eNB 101 may also receive CSIs forwarded from eNBs 102 for those UEs that are served by eNBs 102). Based on collected CSIs, the serving CoMP-MA 101 identifies and selects, in item 132, one or more dominant interferers as potential candidate transmitting eNBs for a selected UE 103. In item 133, the serving CoMP-MA 101 receives PDCP PDUs from SGW. The serving CoMP-MA 101 initiates CoMP joint transmission by forwarding, in item 134, to the candidate transmitting eNBs 102, the PDCP PDUs received from SGW and targeted to the selected UE 103, and by setting, in item 135, the status of the selected UE to be CoMP joint transmission. In item 136, an acknowledgement is received from a candidate transmitting eNB 102, on PDCP PDUs received in the candidate transmitting eNB 102 in case the candidate transmitting eNB 102 is capable of handling the CoMP joint transmission to UE. Based on the acknowledgement, the serving CoMP-MA 101, measures 137 the time spent between forwarding PDCP PDU to eNB2 102 and receiving the corresponding acknowledgement in eNB1 101. Based on the measurement, the serving CoMP-MA 101 adjusts 137 a high threshold and a low threshold of predefined PDCP buffers of the serving CoMP-MA 101. In response radio information required for air interface scheduling becoming available, the serving CoMP-MA 101 extracts 138 radio resource allocations, RLC and MAC headers, references to user plane data included, and precoding matrices from corresponding protocol entities, and forwards 138 the extracted radio resource allocations, RLC and MAC headers, references to the user plane data included, and precoding matrices to the transmitting eNBs 102 that have acknowledged PDCP PDUs, in order the transmitting CoMP-MA to be able to prepare for air interface transmission for UE 103. Thus, in item 138, simultaneous air interface transmission may take place from eNB 101 to UE 103 (parallel with eNB2 102 air interface transmission).

Figure 14:
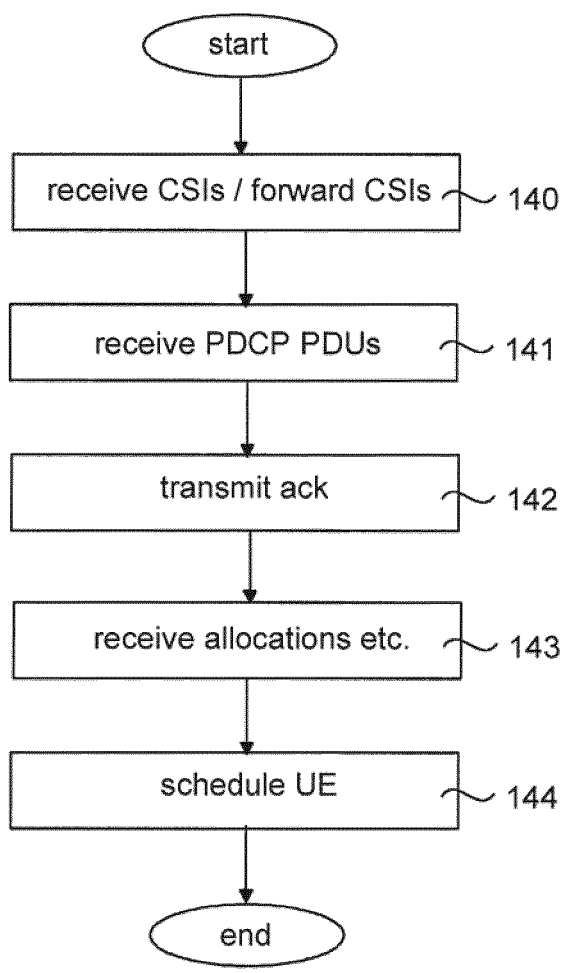
FIG. 14 shows a schematic diagram of a flow chart according to another exemplary embodiment of the invention.

FIG. 14 is a flow chart illustrating an exemplary embodiment. The apparatus 102, which may comprise e.g. a network element (network node, e.g. a LTE-A-capable base station (enhanced node-B, eNB2) of a second cell) may, in item 140, receive collected CSIs from eNB1 101. (In item 140, eNB2 102 may also forward CSIs to eNBs 101 for those UEs that are served by eNB2 102). The serving CoMP-MA 101 initiates CoMP joint transmission by forwarding to the candidate transmitting eNBs 102, the PDCP PDUs received from SGW and targeted to the selected UE 103, and by setting the status of the selected UE to be CoMP joint transmission. Thus, in item 141, a candidate transmitting eNB 102 receives PDCP PDUs from eNB1 101. In item 142, the transmitting CoMP-MA at eNB2 102 transmits, to the serving CoMP-MA 101, an acknowledgement on PDCP PDUs received in the candidate transmitting eNB 102 in case the candidate transmitting eNB2 102 is capable of handling the CoMP joint transmission to UE. In item 143, eNB2 102 receives extracted radio resource allocations, RLC and MAC headers, references to the user plane data included, and precoding matrices from eNB1 101, in order the transmitting CoMP-MA 102 to be able to prepare for air interface scheduling for UE 103. In item 144, the transmitting CoMP-MA schedules the air interface for UE 103.

Thus in an exemplary embodiment, a serving eNB may transmit PDCP PDUs to the other eNBs in the CoMP transmitting set beforehand (based on an appositely configured buffer threshold that depends on a X2 RTT time). When a specific PDCP PDU is scheduled in the serving eNB, only control information needs to be signaled to the other eNBs in the CoMP transmitting set. An exemplary embodiment makes it possible for inter-eNB CoMP joint transmission schemes to be implemented with relaxed backhaul/transport constraints. There may be delay requirements only for control information. Data rate and delay requirements for U-plane data are relaxed due to in advance forwarding, as well as due to the fact that forwarding of precoded data may not be needed. The data to be CoMP-transmitted over the X2 interface from a nominated coordinating eNB may be shared to the others participating as PDCP-level packets, well in advance of the eventual time of transmission on the radio interface. Once the time of a scheduling decision comes, it may be sent along with necessary delay-critical RLC/MAC-level instructions over the same X2 interface as prioritized packets, i.e. bypassing any buffering queues of non-delay critical data on the way. An exemplary embodiment may involve splitting C-plane and U-plane data from X2 point of view, and giving a high priority on scheduling related information.

The steps/points, signalling messages and related functions de-scribed above in FIGS. 1 to 14 are in no absolute chronological order, and some of the steps/points may be performed simultaneously or in an order differing from the given one. Other functions can also be executed between the steps/points or within the steps/points and other signalling messages sent be-tween the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

Thus, in an exemplary embodiment, a method is provided comprising collecting, in a serving CoMP-MA, channel state information, CSIs, periodically reported by user terminals served by a base station within a cooperating set, and forwarding the CSIs periodically reported by the user terminals served by said base station to other base stations within the cooperating set; based on the collected CSIs, identifying and selecting, in the serving CoMP-MA, one or more dominant interferers as potential candidates for transmitting network nodes for a selected user terminal; initiating CoMP joint transmission by forwarding, to the candidates for the transmitting network node for the selected user terminal, PDCP PDUs received from a serving gateway and targeted to the selected user terminal and setting the status of the selected user terminal to joint transmission; receiving an acknowledgement on PDCP PDUs received in a candidate for the transmitting network node, in case the candidate transmitting network node is capable of handling the joint transmission to the user terminal; measuring, in the serving CoMP-MA, time spent between forwarding PDCP PDU and receiving a corresponding acknowledgement; adjusting, based on the measurement, a high threshold and a low threshold of predefined PDCP buffers of the serving CoMP-MA; in response radio information required for air interface scheduling becoming available, extracting, in the serving CoMP-MA, radio resource allocations, RLC and MAC headers, references to user plane data included, and precoding matrices from corresponding protocol entities, forwarding the extracted radio resource allocations, RLC and MAC headers, references to the user plane data included, and precoding matrices to the transmitting network nodes that have acknowledged PDCP PDUs, in order the transmitting CoMP-MA to be able to prepare for air interface scheduling for the user terminal.

In another exemplary embodiment, a method is provided comprising defining a cooperating set comprising selected base stations, wherein members of the cooperating set exchange information including CSI, DL user data and control messages required for proper CoMP operation; defining one or more transmission sets comprising selected base stations of the cooperating set, wherein members of the transmission set simultaneously transmit to a given user terminal; wherein a serving base station serving the user terminal instructs other network nodes from the transmission set to allocate radio resources for its own user terminals, and sends them the DL user data to be transmitted and instructions necessary for coordinated transmission, and wherein a transmitting network node within the transmission set transmits with CoMP JT to a user terminal whose serving base station is a different base station, and receives DL user data and instructions necessary for transmission from the serving base station of the user terminal.

In yet another exemplary embodiment, the member network nodes of the cooperating set remain the same during operation unless reconfigured by a network operator.

In yet another exemplary embodiment, the members of the transmission set are selected dynamically from the cooperating set, such that the transmission set is a subset of the cooperating set.

In yet another exemplary embodiment, for a given user terminal, each base station within the cooperation set which is not its own serving base station, is a potential transmitting network node.

In yet another exemplary embodiment, RTT measurements for a given X2 interface are aggregated into a common high and low threshold.

In yet another exemplary embodiment, a method is provided comprising defining two modes of operation of CoMP-MA, such that CoMP-MA acts as the serving CoMP-MA for user terminals served by base station at which CoMP-MA is attached, and as the transmitting CoMP-MA for user terminals that receive CoMP joint transmission but for which the serving base station is a remote base station.

In yet another exemplary embodiment, in order to reduce X2 interface load, CSIs received through Uu interface are filtered to preselect only those user terminals for CoMP joint transmission that have data in their PDCP buffer waiting to be forwarded over the air interface.

In yet another exemplary embodiment, the pre-selection of the user terminals for CoMP joint transmission comprises identifying candidate user terminals and their candidate transmitting network nodes that are eligible for CoMP joint transmission based on the received CSIs; evaluating the status of the candidate user terminal's PDCP buffer.

In yet another exemplary embodiment, a method is provided comprising serving the user terminal at a cell edge with CoMP joint transmission, due to a high interference from other cells.

In yet another exemplary embodiment, at a PDCP layer a timer based packet discard is employed prohibiting PDUs from being queued for too long, wherein the base stations within the cooperating set are configured with the same discard timer set to a value above a maximum allowed X2 interface RTT.

In yet another exemplary embodiment, a method is provided comprising negotiating with RRC to perform cross-cell scheduling considering only those PRBs that are allocated for CoMP joint transmission and to the transmitting network node in question, to prevent conflicting cross-cell scheduling where two base stations schedule on the same PRB of the same base station.

In yet another exemplary embodiment, PDCP PDUs are scheduled at the serving base station, they are handed over to a RLC layer which executes required protocol operations, and then forwards the resulting RLC PDUs to a MAC layer, wherein RLC PDUs are encapsulated, handed over to a physical layer, and transmitted synchronously from each transmitting network node In yet another exemplary embodiment, if the user terminal signals to its serving node that the user terminal requires a hybrid automatic repeat request HARQ retransmission, the method comprises immediately forwarding, from the serving base station, the retransmission request to each transmitting network node within a scheduling command.

In yet another exemplary embodiment, the scheduling command is created so that relevant information that enables the transmitting network node and/or transmitting CoMP-MA to create an exact replica of MAC PDUs to be scheduled at the same time is included, and information required for physical layer processing, wherein the scheduling command is delivered as high priority data over the X2 interface.

In yet another exemplary embodiment, the scheduling command comprises PDCCH information, information for replication of MAC PDUs, and precoding matrices.

In yet another exemplary embodiment, the transmitting network nodes are informed of specific radio resource allocation and modulation and coding schemes used in order to synchronize transmission, wherein PDCCH data is forwarded from the serving CoMP-MA to the transmitting CoMP-MAs over the X2 interface, along with the PCFICH information for the interpretation of a PDCCH field.

In yet another exemplary embodiment, RLC protocol information is sent in order to reconstruct RLC PDUs, the RLC protocol information including status PDUs, and, in acknowledged mode AM and unacknowledged mode UM, RLC headers used during the encapsulation.

In yet another exemplary embodiment, information used to reassemble PDCP PDUs, comprises a sequence number of PDCP SDU, which is the same as a sequence number of a corresponding PDCP PDU, and in case of an RLC SDU segment, a starting offset of scheduled data from PDCP PDU.

In yet another exemplary embodiment, a first apparatus comprises at least one processor; and at least one memory including a computer program code, wherein the at least one memory and the computer program code are configured to, with the at least one processor, cause the first apparatus to collect channel state information, CSIs, periodically reported by user terminals served by a base station within a cooperating set and forward the CSIs periodically reported by the user terminals served by said base station to other base stations within the cooperating set; based on the collected CSIs, identify and select one or more dominant interferers as potential candidates for transmitting network nodes for a selected user terminal; initiate CoMP joint transmission by forwarding, to the candidates for the transmitting network node for the selected user terminal, PDCP PDUs received from a serving gateway and targeted to the selected user terminal and set the status of the selected user terminal to joint transmission; receive an acknowledgement on PDCP PDUs received in a candidate for the transmitting network node, in case the candidate transmitting network node is capable of handling the joint transmission to the user terminal; measure time spent between forwarding PDCP PDU and receiving a corresponding acknowledgement; adjust, based on the measurement, a high threshold and a low threshold of predefined PDCP buffers of a serving CoMP-MA; in response radio information required for air interface scheduling becoming available, extract radio resource allocations, RLC and MAC headers, references to user plane data included, and precoding matrices from corresponding protocol entities, forward the extracted radio resource allocations, RLC and MAC headers, references to the user plane data included, and precoding matrices to the transmitting network nodes that have acknowledged PDCP PDUs, in order the transmitting CoMP-MA to be able to prepare for air interface scheduling for the user terminal.

In yet another exemplary embodiment, the at least one memory and the computer program code are configured to, with the at least one processor, cause the first apparatus to perform any of the method steps.

In yet another exemplary embodiment, a second apparatus comprises at least one processor; and at least one memory including a computer program code, wherein the at least one memory and the computer program code are configured to, with the at least one processor, cause the second apparatus to forward, to other base stations within a cooperating set, channel state information, CSIs, periodically reported by user terminals served by the second apparatus; receive, from a serving CoMP-MA, channel state information, CSIs, collected from user terminals within a cooperating set, wherein one or more dominant interferers are selected in the serving CoMP-MA as potential candidates for transmitting network nodes for a selected user terminal; receive, from the serving CoMP-MA, PDCP PDUs received from a serving gateway and targeted to the selected user terminal, wherein CoMP joint transmission is initiated and the status of the selected user terminal is set to joint transmission; transmit, to the serving CoMP-MA, an acknowledgement on the received PDCP PDUs, in case a candidate transmitting network node is capable of handling the joint transmission to the user terminal; receive, from the serving CoMP-MA, extracted radio resource allocations, RLC and MAC headers, references to the user plane data included, and precoding matrices, in order the transmitting CoMP-MA to be able to prepare for air interface scheduling for the user terminal.

In yet another exemplary embodiment, the at least one memory and the computer program code are configured to, with the at least one processor, cause the second apparatus to identify, upon the reception of a forwarded PDCP PDU belonging to the user terminal, based on a tunnel endpoint identifier field of a GTP-U header used in a user plane X2.

In yet another exemplary embodiment, the at least one memory and the computer program code are configured to, with the at least one processor, cause the second apparatus to, if the second apparatus is overloaded, discard PDCP PDU in order not to take part in the CoMP joint transmission.

In yet another exemplary embodiment, the at least one memory and the computer program code are configured to, with the at least one processor, cause the second apparatus to when the scheduling command is received, extract the relevant information, select PDCP PDUs indicated in the command and create corresponding MAC PDUs that are exact replicas of those created at the serving base station.

In yet another exemplary embodiment, the at least one memory and the computer program code are configured to, with the at least one processor, cause the second apparatus to negotiate cross-cell scheduling decisions with RRC, wherein when a cross-cell scheduling decision is made, a scheduling command immediately assembled, based on which and previously received PDCP PDUs, MAC PDUs are assembled which are conveyed to a physical layer.

In yet another exemplary embodiment, there is provided a computer program product comprising program code means configured to perform any of the method steps when the program is run on a computer.

In yet another exemplary embodiment, there is provided a computer-readable storage medium comprising program code means configured to perform any of the method steps when executed on a computer.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP 3rd generation partnership project
AM acknowledged mode
BBU base band unit
CB coordinated beamforming
CoMP coordinated multipoint transmission
CoMP-MA CoMP management entity
serving CoMP-MA CoMP management entity in serving eNB
transmitting CoMP-MA CoMP management entity in transmitting eNB
CS coordinated scheduling
CRC cyclic redundancy check
CSI channel state information
CU central unit
DCS dynamic cell selection
DL downlink
DiffServ differentiated services
eNB evolved node-B
GTP-U GPRS tunneling protocol for user plane
HARQ hybrid automatic repeat request
JP joint processing
JT joint transmission
LTE long term evolution
LTE-A long term evolution advanced
MAC medium access control
MPLS-TE multi label protocol switching-traffic engineering
MU multi-user
PCFICH physical control format indicator channel
PDCCH physical downlink control channel
PDCP packet data convergence protocol
PDSCH physical downlink shared channel
PDU protocol data unit
PRB physical resource block
RLC radio link control
RRC radio resource control
RRH remote radio head
RTT round trip time
SDU service data unit
SGW serving gateway
SU single-user
TDD time division duplex
UE user equipment
UL uplink
UM unacknowledged mode
RNC radio network controller
MSS MSC server
MSC mobile switching center

The invention claimed is:

1. A method for coordinated multipoint transmission in a communications system, comprising:

collecting, in a serving network node, channel state information, CSIs, periodically reported by user terminals served by a network node within a cooperating set of network nodes that includes the serving network node;

based on the collected CSIs, identifying and selecting, in the serving network node, one or more of the network nodes in the cooperating set that are dominant interferers as potential candidates for transmitting network nodes for transmitting to a selected user terminal;

initiating by the serving network node coordinated multipoint (CoMP) joint transmission by forwarding, to the potential candidates packets received from a serving gateway and targeted to the selected user terminal;

receiving by the serving network node one or more acknowledgements of the forwarded packets, the one or more acknowledgements indicating the forwarded packets were received in corresponding one or more potential candidate transmitting network nodes, in case the corresponding potential candidate transmitting network node is capable of handling the joint transmission to the selected user terminal, wherein the one or more potential candidate transmitting network nodes from which acknowledgements of the forwarded packets have been received form a transmission set of network nodes; and sending by the serving network node control information to only those network nodes from the cooperating set that are in the transmission set, the control information for use by the network nodes in the transmission set to perform the CoMP joint transmission of at least the forwarded packets to the selected user terminal.

2. The method as claimed in claim 1, wherein:

members of the cooperating set of network nodes exchange information including channel state information (CSI), downlink (DL) user data and control messages required for CoMP operation;

the serving base station serving the selected user terminal instructs the network nodes from the transmission set to allocate radio resources for user terminals served by the serving base station, and sends to the network nodes from the transmission set user data to be transmitted and instructions necessary for the CoMP joint transmission.

3. The method as claimed in claim 1, wherein member network nodes of the cooperating set are selected during a planning/configuration process of the communication system and remain a same during communication system operation unless reconfigured by a network operator.

4. The method as claimed in claim 1, wherein members of the transmission set are selected dynamically from members of the cooperating set, and the transmission set is a subset of the cooperating set.

5. The method as claimed in claim 1, wherein the serving network node is a given network node comprising a coordinated multipoint-management agent (CoMP-MA), and the method further comprises defining two modes of operation of the CoMP-MA, one mode being the CoMP-MA causes the given network node to be a serving network node for user terminals served by the given network node at which CoMP-MA is attached, and another mode being the CoMP-MA causing the given network node to be a transmitting network node for user terminals that receive CoMP joint transmission but for which the given network node is not a serving network node for those user terminals.

6. The method as claimed in claim 1, wherein in order to reduce interface load of an interface between the serving network node and network nodes in the cooperating set, CSIs received through an air interface between the serving network node and user terminals served by the serving node are filtered to preselect CSIs for only those user terminals for CoMP joint transmission that have data in a buffer waiting to be forwarded over the air interface and to send only the preselected CSIs from the serving network node to the network nodes in the cooperating set.

7. The method as claimed in claim 1, wherein the selected user terminal is one of a plurality of selected user terminals and the initiating, receiving and sending are performed for the plurality of selected user terminals and wherein selection of the plurality of selected user terminals for CoMP joint transmission comprises identifying candidate user terminals and their candidate network nodes in the cooperating set that are eligible for CoMP joint transmission based on the received CSIs; and evaluating the status of buffers of the candidate user terminals in order to select ones of the candidate user terminals, as the selected plurality of user terminals, with data to be sent in the buffers.

8. The method as claimed in claim 1, further comprising serving the selected user terminal at a cell edge of a cell formed by the serving network node with CoMP joint transmission, due to a high interference at the selected user terminal from other cells.

9. The method as claimed in claim 1, wherein at the serving network node, a timer based packet discard is employed prohibiting packets from being queued for too long before sending to the selected user terminal, wherein the network nodes within the cooperating set are configured with a same discard timer set to a value above a maximum allowed interface round trip time (RTT) for an interface between the serving network nodes and the network nodes within the cooperating set.

10. The method as claimed in claim 1, further comprising negotiating by the serving network node to perform cross-cell scheduling with the network nodes in the cooperating set considering only those physical resource blocks (PRBs) that are allocated for CoMP joint transmission and allocated to the network nodes in the transmission set, to prevent conflicting cross-cell scheduling where two network nodes schedule on a same PRB of a same network node.

11. The method as claimed in claim 1, wherein, if the selected user terminal signals to its serving node that the selected user terminal requires a hybrid automatic repeat request (HARQ) retransmission, the method comprises forwarding, from the serving base station and within a scheduling command, the retransmission request to each network node in the transmission set.

12. The method as claimed in claim 11, wherein the scheduling command is created so that relevant information is included that enables the network nodes in the transmission set to create an exact replica of medium access control (MAC) packet data units (PDUs), comprising the forwarded packets, to be scheduled and transmitted at a same time.

13. The method as claimed in claim 12, wherein the scheduling command comprises physical downlink control channel (PDCCH) information, information for replication of the MAC PDUs, and precoding matrices to be used by the network nodes in the transmission set to multiply their signals with the precoding matrices to generate transmission signals to be transmitted at their specific antenna elements.

14. The method as claimed in claim 1, wherein the network nodes in the transmission set are informed of specific radio resource allocation and modulation and coding schemes used in order to synchronize transmission of the CoMP joint transmission, wherein physical downlink control channel (PDCCH) data is forwarded from the serving network node to the network nodes in the transmission set over an X2 interface, along with the physical control format indicator channel (PCFICH) information for interpretation of a PDCCH field.

15. The method as claimed in claim 1, wherein radio link control (RLC) protocol information is sent by the serving network node in order for the network nodes in the transmission set to reconstruct RLC packet data units (PDUs) comprising the forwarded packets, the RLC protocol information including status PDUs, and, in acknowledged mode (AM) and unacknowledged mode (UM), RLC headers used during encapsulation of the forwarded packets into the RLC PDUs.

16. The method as claimed in claim 15, further comprising the serving network node sending information to allow the network nodes in the transmission set to reassemble packet data convergence protocol (PDCP) packet data units (PDUs) wherein the information used to reassemble the PDCP PDUs comprises a sequence number of a PDCP service data unit (SDU), which is a same as a sequence number of a corresponding PDCP PDU, and in case of an RLC service data unit (SDU) segment, a starting offset of scheduled data from a PDCP PDU.

17. The method of claim 1, wherein the forwarded packets are from a packet data control protocol (PDCP) buffer and wherein the serving network node defines a high threshold and a low threshold for the PDCP buffer, and wherein the selected user terminal is selected as eligible for joint transmission in response to an estimated waiting time to send data in the PDCP buffer exceeds the high threshold and packets in the PDCP buffer are forwarded until the estimated waiting time drops below the low threshold.

18. The method of claim 1, further comprising the serving network node forwarding the CSIs periodically reported by the user terminals served by the serving network to network nodes within the cooperating set.

19. An apparatus comprising at least one processor; and at least one memory including a computer program code, wherein the at least one memory and the computer program code are configured to, with the at least one processor, cause the apparatus to collect, in a serving network node, channel state information, CSIs, periodically reported by user terminals served by a network node within a cooperating set of network nodes that includes the serving network node;

based on the collected CSIs, identify and select in the serving network node one or more of the network nodes in the cooperating set that are dominant interferers as potential candidates for transmitting network nodes for transmitting to a selected user terminal;

initiate by the serving network node coordinated multipoint (CoMP) joint transmission by forwarding, to the potential candidates for the transmitting network node for the selected user terminal, packets received from a serving gateway and targeted to the selected user terminal;

receive by the serving network node one or more acknowledgements of the forwarded packets, the one or more acknowledgements indicating the forwarded packets were received in corresponding one or more potential candidate nodes, in case the corresponding potential candidate transmitting network node is capable of handling the joint transmission to the selected user terminal, wherein the one or more potential candidate transmitting network nodes from which acknowledgements of the forwarded packets have been received form a transmission set of network nodes; and sending by the serving network node control information to only those network nodes from the cooperating set that are in the transmission set, the control information for use by the network nodes in the transmission set to perform the CoMP joint transmission of at least the forwarded packets to the selected user terminal.

20. A computer program product, comprising a non-transitory computer-readable medium having program code configured thereon to cause a computer to perform, when the program is run on the computer, operations comprising:

collecting, in a serving network node, channel state information, CSIs, periodically reported by user terminals served by a network node within a cooperating set of network nodes that includes the serving network node;

based on the collected CSIs, identifying and selecting, in the serving network node, one or more of the network nodes in the cooperating set that are dominant interferers as potential candidates for transmitting network nodes for transmitting to a selected user terminal;

initiating by the serving network node coordinated multipoint (CoMP) joint transmission by forwarding, to the potential candidates packets received from a serving gateway and targeted to the selected user terminal;

receiving by the serving network node one or more acknowledgements of the forwarded packets, the one or more acknowledgements indicating the forwarded packets were received in corresponding one or more potential candidate transmitting network nodes, in case the corresponding potential candidate transmitting network node is capable of handling the joint transmission to the selected user terminal, wherein the one or more potential candidate transmitting network nodes from which acknowledgements of the forwarded packets have been received form a transmission set of network nodes; and sending by the serving network node control information to only those network nodes from the cooperating set that are in the transmission set, the control information for use by the network nodes in the transmission set to perform the CoMP joint transmission of at least the forwarded packets to the selected user terminal.

* * * * *

UNITED STATES PATENT AND TRADEMARK OFFICE
CERTIFICATE OF CORRECTION

PATENT NO. : 10,334,585 B2
APPLICATION NO. : 14/776952
DATED : June 25, 2019
INVENTOR(S) : Zoltan Vincze, Csaba Vulkan and Arpad Drozdy Page 1 of 1

It is certified that error appears in the above-identified patent and that said Letters Patent is hereby corrected as shown below:

In the Claims

In Claim 7:
Column 29, Line 64, "the status" should be deleted and --status-- should be inserted Signed and Sealed this
Twenty-seventh Day of August, 2019

Andrei Iancu
*Director of the United States Patent and Trademark Office*